US012571194B2

(12) United States Patent

Schuster et al.

(10) Patent No.: US 12,571,194 B2
(45) Date of Patent: Mar. 10, 2026

(54) SYSTEMS FOR HUMAN WASTE COLLECTION AND PROCESSING

(71) Applicant: Hamilton Sundstrand Space Systems International, Inc., Windsor Locks, CT (US)

(72) Inventors: Ashley Rose Himmelmann Schuster, Chicago, IL (US); Beakal Teshome Woldemariam, South Windsor, CT (US); Thao Hoang, Arlington, WA (US); Timothy Monson, Winnebago, IL (US); Kevin Litton, Houston, TX (US); Thomas Gay, Enfield, CT (US); Casey Myers, Parker, CO (US); Liana J. He, West Hartford, CT (US)

(73) Assignee: HAMILTON SUNDSTRAND SPACE SYSTEMS INTERNATIONAL, INC., Windsor Locks, CT (US)

( * ) Notice: Subject to any disclaimer, the term of this patent is extended or adjusted under 35 U.S.C. 154(b) by 100 days.

(21) Appl. No.: 18/734,373

(22) Filed: Jun. 5, 2024

(65) Prior Publication Data

US 2025/0257555 A1    Aug. 14, 2025

Related U.S. Application Data

(60) Provisional application No. 63/552,255, filed on Feb. 12, 2024.

(51) Int. Cl.
*E03D 11/11* (2006.01)
*A47K 11/02* (2006.01)
(Continued)

(52) U.S. Cl.
CPC .............. *E03D 11/11* (2013.01); *A47K 11/02* (2013.01); *B64G 1/60* (2013.01); *E03D 5/016* (2013.01);
(Continued)

(58) Field of Classification Search
CPC ......... E03D 11/11; E03D 5/016; E03D 9/052; E03D 9/08; E03D 2201/40; E03D 9/05; A47K 11/02; B64G 1/60
See application file for complete search history.

(56) References Cited

U.S. PATENT DOCUMENTS 3,405,454 A    10/1968 Zeff
4,955,090 A     9/1990 Stefan
(Continued)

FOREIGN PATENT DOCUMENTS

CN          110683740 A      1/2020
CN          110720854 A      1/2020
(Continued)

*Primary Examiner* — Christine J Skubinna
(74) *Attorney, Agent, or Firm* — CANTOR COLBURN LLP

(57)          ABSTRACT
Waste collection and processing systems for use in low-gravity environments include a toilet having a bowl and a lid; a first waste tank having an inlet and an outlet, with the bowl of the toilet selectively fluidly coupled to the inlet of the first waste tank; a second waste tank having an inlet and an outlet, with the bowl of the toilet is selectively fluidly coupled to the inlet of the second waste tank; a controller configured to selectively operate each of the first waste tank and the second waste tank between reclamation modes of operation and collection modes of operation. When the first waste tank is operated in the reclamation mode of operation the second waste tank is operated in the collection mode of operation and vice versa.

20 Claims, 12 Drawing Sheets

100 —

(51) Int. Cl.
  *B64G 1/60* (2006.01)
  *E03D 5/016* (2006.01)
  *E03D 9/052* (2006.01)
  *E03D 9/08* (2006.01)

(52) U.S. Cl.
  CPC .............. *E03D 9/052* (2013.01); *E03D 9/08* (2013.01); *E03D 2201/40* (2013.01)

(56) References Cited

U.S. PATENT DOCUMENTS

| | | | |
|---|---|---|---|
| 11,235,997 B2 * | 2/2022 | Aggarwal | .............. C02F 1/001 |
| 11,871,880 B2 | 1/2024 | Qu et al. | |
| 2014/0013498 A1 * | 1/2014 | Boodaghians | .......... E03F 1/006 |
| | | | 4/144.1 |
| 2021/0062491 A1 | 3/2021 | Cao et al. | |
| 2022/0240734 A1 * | 8/2022 | Qu | ......................... C02F 11/13 |
| 2025/0256866 A1 | 8/2025 | Schuster et al. | |
| 2025/0257554 A1 | 8/2025 | Schuster et al. | |
| 2025/0257556 A1 | 8/2025 | Schuster et al. | |

FOREIGN PATENT DOCUMENTS

| | | | |
|---|---|---|---|
| JP | H01153398 A | 6/1989 | |
| WO | 2021068651 A1 | 4/2021 | |

* cited by examiner

700

SYSTEMS FOR HUMAN WASTE COLLECTION AND PROCESSING

CROSS-REFERENCE TO RELATED APPLICATIONS

This application claims the benefit of U.S. Provisional Patent Application No. 63/552,255 filed Feb. 12, 2024, the disclosure of which is incorporated herein by reference in its entirety.

BACKGROUND

The subject matter disclosed herein generally relates to systems for collection and processing of human waste and, more particularly, to various systems and collection devices for processing human waste in low-gravity and/or space environments.

When humans reside in relatively closed spaces or environments (e.g., on ships, aircraft, spacecraft, stations, habitats, etc.), or in remote locations or the like, human waste must be managed to avoid contamination or disease and to ensure sanitary conditions for human safety. If conventional plumbing is not required or possible, or there are environmental impacts to plumbing functionality, specific or uniquely designed systems may be required to manage human waste. For example, when in low, micro, or no gravity environments (e.g., in space or on non-Earth celestial bodies), a lack of gravity or reduced gravity may prevent conventional plumbing from being employed, as such systems may rely upon gravity for operation thereof. Further, due to a lack of gravitational force, containment of liquids and solids is an important consideration, particularly for containment of waste that can pose health or other hazards or risks. Additionally, due to the limitations of closed-system environments, particularly in spacecraft, processing of waste and reclamation of water may be important for reducing the total consumable load of the platform.

In current space-based applications, four systems (i.e., a toilet, a urine processor assembly, a brine processor assembly, and a fecal processor assembly) are required to most thoroughly collect, store, and process human waste. For use of these systems, the toilet requires separate collection of urine (liquid) and non-urine waste (liquid, solid, etc.). Requiring separate collection of urine and non-urine waste streams results in complex requirements and design constraints on the space toilet solution including separate urine and non-urine waste collection ports, which may not be intuitive or as user-friendly as terrestrial designs, particularly for women. Separate urine and non-urine waste collection ports minimizes the ability to reuse hardware and system configurations from terrestrial applications, such as components used for aircraft lavatories or the like. Accordingly, improved systems for waste capture and processing may be advantageous in a variety of applications, including systems that are used in low-gravity environments (e.g., in space).

SUMMARY

Embodiments of the present disclosure are directed to waste collection and processing systems and related methods of use. The systems described herein may be implemented and installed and used for space-based applications, such as in low-gravity environments, zero-gravity environments, low-gravity surface environments, and the like. Embodiments of the present disclosure provide for improved systems that may reduce weight and complexity while improving system efficiency related to recapture of air and/or water from human waste.

According to some embodiments, waste collection and processing systems for use in low-gravity environments are provided. The waste collection and processing systems include a toilet having a bowl and a lid; a first waste tank having an inlet and an outlet, wherein the bowl of the toilet is selectively fluidly coupled to the inlet of the first waste tank; a second waste tank having an inlet and an outlet, wherein the bowl of the toilet is selectively fluidly coupled to the inlet of the second waste tank; a controller configured to selectively operate each of the first waste tank and the second waste tank between reclamation modes of operation and collection modes of operation. When the first waste tank is operated in the reclamation mode of operation the second waste tank is operated in the collection mode of operation; and when the first waste tank is operated in the collection mode of operation the second waste tank is operated in the reclamation mode of operation.

In addition to one or more of the features described herein, or as an alternative, further embodiments of the waste collection and processing systems may include that a switch configured to be actuated to cause operation of the controller.

In addition to one or more of the features described herein, or as an alternative, further embodiments of the waste collection and processing systems may include that the switch is integral with the toilet and configured to be actuated in response to opening and closing of the lid.

In addition to one or more of the features described herein, or as an alternative, further embodiments of the waste collection and processing systems may include a filter assembly arranged downstream from the first waste tank and the second waste tank and configured to receive a gas from the first waste tank and the second waste tank when the respective waste tank is in the reclamation mode of operation.

In addition to one or more of the features described herein, or as an alternative, further embodiments of the waste collection and processing systems may include a fan configured to pull the gas from the respective waste tank into the filter assembly.

In addition to one or more of the features described herein, or as an alternative, further embodiments of the waste collection and processing systems may include waste capture hardware arranged at the outlet of each of the first waste tank and the second waste tank, and upstream from the filter assembly.

In addition to one or more of the features described herein, or as an alternative, further embodiments of the waste collection and processing systems may include an outlet valve at the outlet of each of each of the first waste tank and the second waste tank, and upstream from the filter assembly.

In addition to one or more of the features described herein, or as an alternative, further embodiments of the waste collection and processing systems may include a first waste bag arranged within the first waste tank and a second waste bag arranged within the second waste tank, wherein each of the first waste bag and the second waste bag are permeable to gas and impermeable to liquid waste and solid waste.

In addition to one or more of the features described herein, or as an alternative, further embodiments of the waste collection and processing systems may include a first heater operably coupled to the first waste tank and a second heater operably coupled to the second waste tank.

In addition to one or more of the features described herein, or as an alternative, further embodiments of the waste collection and processing systems may include at least one fluid injector arranged to inject at least one of water, cleaning fluid, and waste treatment fluid into at least one of the bowl and a flow path between the bowl and the first and second waste tanks.

In addition to one or more of the features described herein, or as an alternative, further embodiments of the waste collection and processing systems may include a waste capture airflow system integrated with the toilet, the waste capture airflow system configured to generate a flow of air through the bowl.

In addition to one or more of the features described herein, or as an alternative, further embodiments of the waste collection and processing systems may include that the generated flow of air from the waste capture airflow system is directed to capture and direct human waste into and through the bowl toward the waste tank that is operated in the capture mode of operation.

In addition to one or more of the features described herein, or as an alternative, further embodiments of the waste collection and processing systems may include that the controller is configured to cause an airflow through the waste tank operated in the reclamation mode of operation to direct air from the respective waste tank to a system outlet.

In addition to one or more of the features described herein, or as an alternative, further embodiments of the waste collection and processing systems may include that the system outlet is an occupied space that is part of a spacecraft.

In addition to one or more of the features described herein, or as an alternative, further embodiments of the waste collection and processing systems may include that the system outlet is an occupied space that is part of a space station.

In addition to one or more of the features described herein, or as an alternative, further embodiments of the waste collection and processing systems may include a waste bag arranged within the bowl, the waste bag being permeable to gas and impermeable to liquid waste and solid waste.

In addition to one or more of the features described herein, or as an alternative, further embodiments of the waste collection and processing systems may include a venting system fluidly coupled to the outlets of each of the first waste tank and the second waste thank, the venting system operable to perform a sanitation operate to vent the first and second waste tanks.

In addition to one or more of the features described herein, or as an alternative, further embodiments of the waste collection and processing systems may include a recapture system arranged downstream from the first waste tank and the second waste tank, the recapture system configured to process humid air received from the first and second waste tanks.

In addition to one or more of the features described herein, or as an alternative, further embodiments of the waste collection and processing systems may include that the recapture system includes a condenser arranged to receive the humid air from the first and second waste tanks and cool the humid air; a phase separator arranged to receive the cooled humid air and separate water content from the air, wherein the air from the phase separator is treated at an air filter system, and wherein the water from the phase separator is treated in a liquid filter system.

In addition to one or more of the features described herein, or as an alternative, further embodiments of the waste collection and processing systems may include a regenerative heat exchanger configured to receive an output from the first and second waste tanks as a first working fluid and the treated air from the air filter system as a second working fluid, the regenerative heat exchanger configured to cool the output from the first and second waste tanks prior to entering the condenser.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
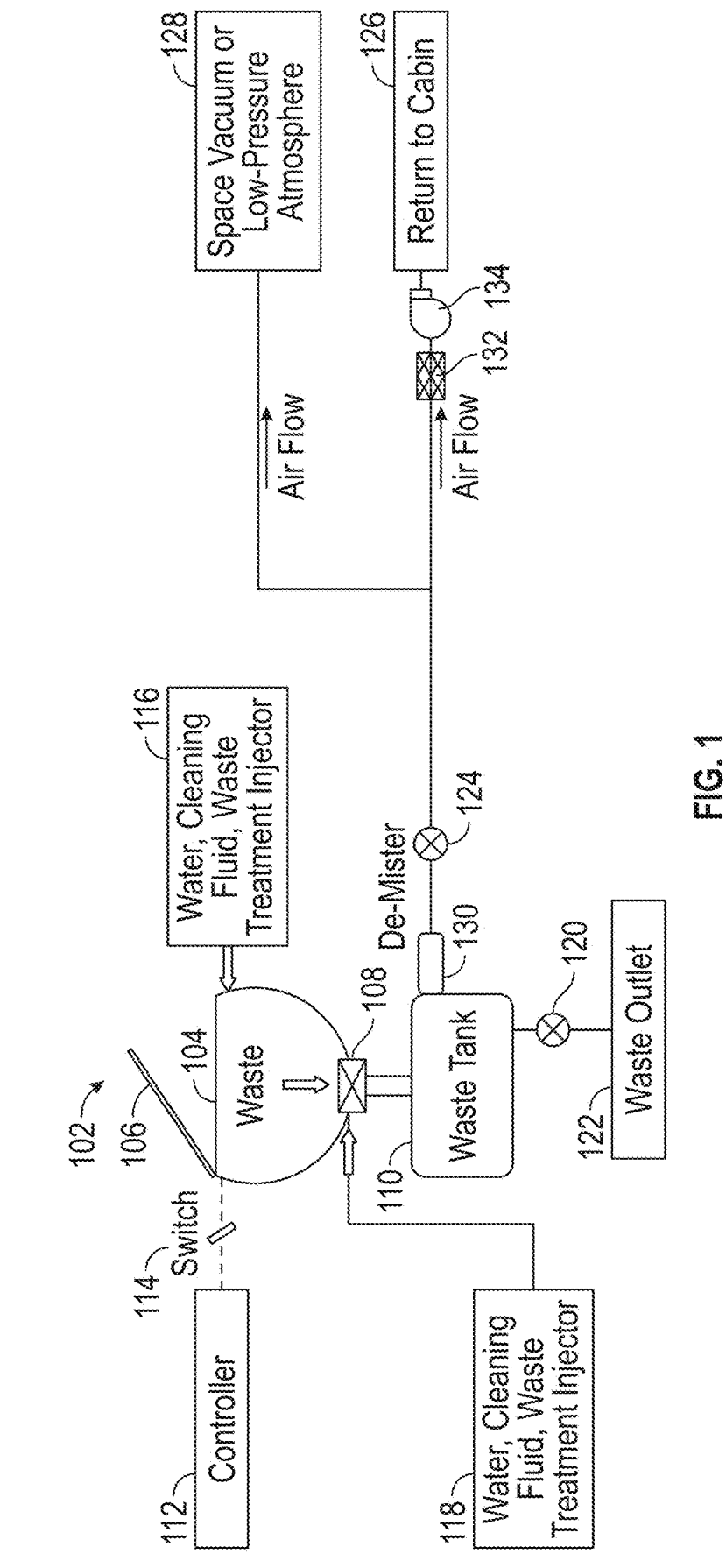
FIG. 1 is a schematic illustration of a first illustrative configuration of a waste collection and processing system in accordance with the present disclosure.

When humans reside in relatively closed spaces or environments (e.g., on ships, aircraft, spacecraft, bases, habitats, etc.), or in remote locations or the like, human waste must be managed to avoid contamination and/or disease and to ensure proper sanitation. If conventional plumbing is not required or possible or there are environmental impacts to plumbing functionality, specific or uniquely designed systems may be required to manage human waste. For example, when in low, micro, or no gravity (e.g., in space), a lack of gravity prevents conventional plumbing from being employed. Further, due to the lack of gravity, containment of liquids and solids is an important consideration. Additionally, due to the limited closed-system environments, particularly in spacecraft, processing of waste and reclamation of water may be important for reducing the total consumable load of the platform. As used herein, the terms "low-gravity" and "low-gravity environment(s)" refer to non-Earth based environments that have a gravity less than the gravity of Earth (e.g., less than 1 g). These terms are thus intended to be inclusive of low-gravity (e.g., asteroids, moons, Mars, etc.) and zero-gravity (e.g., onboard spacecraft traveling between celestial bodies, craft and stations in orbit, etc.), and similar environments and is inclusive of artificial gravity applications.

In current space-based or low-gravity applications, waste collection and processing is typically achieved using four systems (e.g., a toilet, a urine processor assembly, a brine processor assembly, and a fecal processor assembly). These four systems may be required to provide a thorough and complete collection, storage, and processing of human waste. For use of these systems, the toilet requires separate collection of urine and non-urine waste. Requiring separate collection of urine and non-urine waste streams results in complex requirements and design constraints on the space toilet solution. For example, separate urine and non-urine waste collection ports may be required, which may not be intuitive or user-friendly as conventional terrestrial designs, particularly for women. Additionally, the use of separate urine and non-urine waste collection ports minimizes the ability to reuse hardware from terrestrial (or Earth-based) applications, such as components used for aircraft applications or the like. Such systems may also require the inclusion of a pre-treat mechanism, which is a waste treatment fluid that controls microbial growth and prevents solids from forming or ammonia off-gassing during processing. Accordingly, improved systems for waste capture and processing may be advantageous in a variety of applications.

In current waste collection systems used in low-gravity environments, (e.g., onboard spacecraft), the waste collection systems enable collection of human waste and reclamation of water present in the waste. The necessary functions of waste collection and storage, along with reclamation of water from such waste, can drive the design of such systems to be complex and special-purpose, requiring unique or special-made components. The low-gravity environments that may require unique waste collection systems, beyond spacecraft applications, includes, without limitation, space stations (e.g., orbit), deep space exploration (e.g., space travel), and non-Earth surface operations (e.g., on the surface of the Moon, Mars, asteroids, and other relatively low-gravity bodies). Some such applications may not require toilets that are compatible with a zero or no-gravity environments, but may require systems that are lighter, smaller, more reliable and provide longer life, and require fewer consumables than conventional (e.g., Earth-based) toilet and processing solutions. That is, for some space surface applications, the complexity and features necessary for zero-gravity applications are not as strict, and thus such space surface application toilets may allow for less complexity than zero-gravity applications.

In view of the above and other considerations, some embodiments of the present disclosure are directed to space and/or space surface applications that incorporate a vacuum for providing motive force within a waste collection system, such as a human waste collection and processing system. In accordance with such embodiments, a commode or toilet with waste storage features that leverages a vacuum system is adapted for use in space. Such systems are capable of use in environments imposed by Deep Space applications (e.g., reduced gravity, increased radiation, etc.). In some embodiments, radiation tolerant electronics and/or redundant and maintainable radiation tolerance strategies may be implemented. Furthermore, such waste collection and processing systems may be used for non-surface operations, such as onboard spacecraft or stations that provide artificial gravity.

In accordance with some of the space surface applications described herein, some hardware from aircraft applications may be employed. However, because such systems are intended for use under the gravity of Earth, application to low-gravity environments may require modifications or complete rework of certain features and/or systems to enable functional operation in low-gravity environments. For example, application to low-gravity environments may require a need for reclamation from waste (e.g., water and/or air) and/or water/air loss minimization. As such, modifications of conventional aircraft systems is required for consideration of application to low-gravity environments. In accordance with some embodiments of the present disclosure, a single source (e.g., all types of human waste) or separate source waste collection (e.g., urine versus non-urine human waste), with options for rinse and/or waste treatment mechanisms are provided. In some embodiments, an optional vacuum generation or motive force may be achieved by exposure to the vacuum of space (or low atmospheric pressure environment) or use of a vacuum pump may be employed to generate a motive force on the waste to drive the waste through the system without the aid of gravity. In accordance with some embodiments, the total complexity and cost of the system may be reduced by relying upon manual maintenance and cleaning (e.g., at a given interval) as compared to powered cleaning and/or maintenance systems. In other embodiments, an automated or automatic rinse mechanism or other cleaning mechanism may be implemented. In still other embodiments, disposable bowls, cups, collectors, or other consumables (e.g., liners or the like) may be used, thereby reducing or eliminating the need for direct cleaning of a bowl or other structure used to receive human waste.

Referring now to FIG. 1, a schematic diagram of a waste collection and processing system 100 in accordance with an embodiment of the present disclosure is shown. The waste collection and processing system 100 may be configured to collect and process human waste (e.g., urine, feces, menses), and is configured to be implemented, used, and operated in low-gravity environments. The waste collection and processing system 100 includes a toilet 102 having a bowl 104 and a lid 106. In use, a user will open the lid 106 and deposit waste into the bowl 104 where the waste will be collected and processed within the waste collection and processing system 100, as described herein. In some embodiments, the lid 106 may be configured to sealingly engage with a surface or rim of the bowl 104. The waste that is deposited into the toilet 102 may have liquid and solid components, and reclamation of water from the waste may be desirable for users of systems in low-gravity environments (e.g., space stations, spacecraft, non-Earth stations, etc.). Accordingly, the waste collection and processing system 100 is configured to extract the water content from the waste deposited into the toilet 102.

As shown, the toilet 102 is configured with a first valve 108 that is operated to allow for waste within the bowl 104 of the toilet 102 to be pulled into a waste tank 110. In a closed state, the first valve 108 prevents fluid communication from the bowl 104 to the waste tank 110. The first valve 108 may be selectively opened to provide fluid coupling or connection between an interior of the bowl 104 and an interior of the waste tank 110. In some embodiments, the first valve 108 may be operably controlled by a controller 112 of the waste collection and processing system 100. In other embodiments, the first valve 108 may be manually controlled with a lever, foot pedal, or the like. The controller 112 may include various processors, memory, input/output components, and the like, as will be appreciated by those of skill in the art. In other configurations, the controller 112 may be a more basic controller, receiving input and output and causing opening and/or closing of valves, without programmed control (e.g., operable like a switch for on/off or open/closed). The waste collection and processing system 100 may include a switch 114 to cause operation of the waste collection and processing system 100. For example, activation or operation of the switch 114 may cause the first valve 108 to open and/or close. In some configurations, the switch 114 may be a manually operated switch that is toggled by a user after depositing waste into the toilet 102. In other embodiments, the switch 114 may integrated into the bowl 104 and/or lid 106 such that when the lid 106 is closed on the bowl 104, the switch 114 is actuated or operated to cause the first valve 108 to open and transfer any deposited waste within the bowl 104 into the waste tank 110.

As shown, one or more optional fluid injectors 116, 118 may be provided to inject water, cleaning fluid, waste treatment fluid, or the like, directly into the bowl 104 and/or to be mixed with the waste as it is transferred from the bowl 104 to the waste tank 110 (e.g., within the first valve 108 or upstream or downstream therefrom). The fluid injectors 116, 118 can provide for an optional first processing step that is initialized at the time a user completes their deposit of waste into the toilet 102. The injected fluids or chemicals provided by the fluid injectors 116, 118 may initiate a waste treatment and processing and/or may provide for cleaning of surfaces of the lid 106, the bowl 104, the first valve 108, and/or the piping and conduits connecting the bowl 104 to the waste tank 110.

The waste is then collected within the waste tank 110. The waste tank 110 may be an enclosure for receiving human waste. The waste tank 110 may, in some embodiments, include bags, filters, disposable components, or the like, for the purpose of waste capture and treatment, with considerations made for ensuring liquids and/or solids do not escape the tank 110 and enter a space, room, or area that is occupied by humans (e.g., cabin or the like of a spacecraft). The first valve 108 is arranged at an inlet of the waste tank 110 and, in this configuration, the waste tank 110 may have two outlets each with a respective valve. For example, as shown, a second valve 120 may be controlled to selectively open to allow for waste within the waste tank 110 to be directed to a waste outlet 122, which may include an optional pump for providing a motive force to move the waste from the waste tank 110 to the waste outlet 122. The waste outlet 122 may be configured to receive solid waste, liquid waste, or a combination of solid and liquid waste, depending on the specific application and configuration of the system. The waste outlet 112 may define a flow path for waste to travel to storage or additional processing locations, such as plumbing.

At the second outlet of the waste tank 110, a third valve 124 is provided. The third valve 124 may be configured to allow for gas extraction from the waste tank 110. As such, the third valve 124 may be configured to permit, at most, liquids and gases, but may be configured to prevent solid waste to pass therethrough. The third valve 124 may be configured as part of an air and/or water reclamation system that directs airflow from the waste tank 110 through various systems, and may be configured to recycle treated gas (e.g., air) back into an occupied space 126 (e.g., spacecraft cabin) or direct treated or untreated gases to an external environment 128 (e.g., space, low-pressure atmosphere, etc.). In some embodiments, and as shown, an optional de-mister 130 may be provided at an outlet of the waste tank 110 and upstream from the third valve 124 (i.e., between the waste tank 110 and the third valve 124). In other embodiments, the de-mister may be arranged downstream from the third valve 124. The optional de-mister 130 may be a passive or active device for causing moisture from an airflow passing from the waste tank 110 to be removed. In some configurations, the de-mister 130 may be configured as a tortuous flow path with baffles or the like that are impinged upon by the airflow, causing moisture to condense out of the air. As such, the de-mister 130 may be included to generate a relatively dry air that is output from the waste tank 110. In configurations where the extracted air is to be supplied back into the occupied space 126, the airflow may be passed through an air filter assembly 132. The air filter assembly 132 can include odor and/or bacterial filters and the like to remove any odors or bacteria that may still be carried on the flow of air from the waste tank 110. Such treated air may be supplied into the occupied space 126, such as a spacecraft cabin or the like.

In some configurations, a pump 134, such as a vacuum pump, may be configured to induce a motive force to drive the air from the waste tank 100, through the de-mister 130, the third valve 124, and the air filter assembly 132 to generate treated air that can be directed into the occupied space 126. In some configurations, the pump 134 may be controllable or selectively operated by the controller 112 or another controller associated with the waste collection and processing system 100. In embodiments where the air from the waste tank 110 is to be directed to the exit at the external environment 128, the external environment 128 itself may provide the vacuum or motive force for pulling the airflow from the waste tank 110. It will be appreciated that although both fluid paths are illustrated (e.g., to the occupied space 126 and the external environment 128), in other embodiments, only one of these two fluid paths may be present. Further, in some embodiments, a valve or the like may be arranged at the junction/split to the two exits, which may be manually or automatically controlled (e.g., by controller 112).

The airflow paths downstream from the third valve 124 may include additional components and the like, as will be appreciated by those of skill in the art. For example, and without limitation, in some embodiments, the flow paths to either exit may include various dehumidification hardware such as desiccant bed(s), condensing heat exchanger(s), additional passive or active de-mister systems, and the like. Further, at the waste outlet 122, additional processing may be employed to further process the waste after the waste is removed from the waste tank 110, such as water reclamation or the like.

In accordance with some embodiments of the present disclosure, the waste collection and processing system 100 may be configured for operation in three modes. A first mode of operation may be referred to as a system reset operation, a second mode of operation may be referred to as a waste deposit operation, and a third mode of operation may be referred to as a waste removal operation. The various operational modes may be controlled, at least in part, by the controller 112.

In the first operational mode (System Reset Operation), the controller 112 will cause both the first valve 108 and the second valve 120 to enter a closed state (if not already in a closed state). The controller 112 will then cause the third valve 124 to open. If the system 100 is configured to vent to vacuum or low pressure atmosphere (e.g., external environment 128), air in the waste tank 110 is vented to the external atmosphere, and the waste tank 110 is brought to a low pressure state (e.g., lower than ambient pressure within the occupied space 126, inclusive of vacuum pressure). If the system 100 is configured to return air back to a cabin or the like (e.g., occupied space 126), the controller 112 may be configured to activate the pump 134, which will cause air within the waste tank 110 to be extracted therefrom and the waste tank 110 may be brought to a low pressure state. As noted above, the configuration illustrated in FIG. 1 is merely schematic and a system in accordance with the present disclosure may include only one of the two airflow paths that exit from the waste tank 110 and/or the third valve 124 may be configured to selectively direct an airflow into one of the two distinct flow paths (e.g., to the external environment 128 or to the occupied space 126). With the waste tank 110 brought to a low pressure state, the third valve 124 will then be closed (resulting in all three valves 108, 120, 124 being closed). At this point, the waste collection and processing system 100 is ready to be used.

In the second operational mode (Waste Deposit Operation), airflow, gravity, or combinations thereof may be employed to direct human waste deposited by the user into the toilet 102 to be directed into the waste tank 110. In such an operational mode, opening of the lid 106 may optionally actuate a mechanical switch (e.g., the switch 114) which can activate the controller 112. In other embodiments, a user may toggle or actuate the switch 114 to initiate the waste deposit operation. Due to the fact that the systems of the present disclosure may be implemented onboard spacecraft, and such spacecraft may be exposed to radiation, consideration of the effects of such radiation on the system may be important. For example, radiation effects scale with duty cycle, and the inclusion of a switch 114 that is tied to opening/closing of the lid 106 may minimize the duration in which the controller 112, and potentially any other associated electronics, is powered on, resulting in minimizing the impact of radiation exposure to the electronic components.

In the second mode of operation, a user will deposit human waste into the bowl 104, similar to toilet use in terrestrial applications. When the user has completed use of the toilet 102, a 'flush' is activated by operation of the switch 114, such as by manual actuation of the switch 114 by the user after closing the lid 106 or by the actuation of the switch 114 by closing the lid 106. When the 'flush' is activated, the controller 112 directs the first valve 108 to open. During use (e.g., depositing waste), the toilet 102 will be exposed to the surrounding ambient atmosphere (e.g., ambient pressure of the occupied space 126), and thus the bowl will have a pressure that is about at atmospheric pressure. When the first valve 108 is opened, the volume of the toilet 102 will be exposed to the low pressure state within the waste tank 110 that is generated during the first operational mode. It is noted that the opening of the first valve 108 may be tied to the lid 106 in some manner to ensure that the first valve 108 does not open when the lid 106 is open. With the lid 106 closed and the first valve 108 opened, the pressure differential between the toilet 102 and the waste tank 110 will create a suction force and cause the waste within the bowl 104 to flow into the waste tank 110.

Before, during, or after the second mode of operation, an optional cleaning or treatment step may be performed. For example, before or during the opening of the first valve 108, a first fluid injector 116 may be operated to direct water, cleaning fluid, or waste treatment fluids into the bowl 104, and/or a second fluid injector 118 may be operated to direct similar fluids into the first valve 108 or within or along a flow pipe/path that connects the bowl 104 to the waste tank 110. The fluids injected by the fluid injectors 116, 118 may be pulled into the waste tank 110 along with the waste. Once the waste (and optional treatment and/or cleaning fluids) has been pulled into the waste tank 110, the first valve 108 may be closed, fluidly sealing the connection between the toilet 102 and the waste tank 110. The controller 112 may then perform the first operational mode (System Reset Operation), as described above, resetting the system 100 for another user. This sequence of the first and second operational modes may be performed until the waste tank 110 reaches capacity or when the third operational mode is initiated.

In the third operational mode (Waste removal), waste is removed from the waste collection and processing system 100 by opening the second valve 120 and either pumping waste out (pump not shown) or using gravity to remove waste from the waste tank 110. As discussed above, the resetting operation will cause removal of gases from the waste tank 110. However, the solid and liquid waste deposited within the waste tank 110 will be held in the waste tank 110. During the waste removal operation, the waste is removed from the waste tank 110 and directed to the waste outlet 122. In some configurations, and during the waste removal operation, a rinsing operation may be performed within the waste tank 110 to clean or remove any waste that may be attached to the sides of the waste tank 110 and/or such fluid may aid in removing the waste from the waste tank 110. During the waste removal operation, the waste may be directed into a waste processing system or the like, where water extraction and/or reclamation and/or other waste processing may be performed. In some embodiments, the waste tank 110 may be configured with rinsing capabilities that are initiated and operated at the completion of the third operational mode. Such rinsing operations may include one or more additional fluid injectors arranged to inject fluids (e.g., water, cleaning fluids, disinfectants, etc.) into the waste tank 110.

It will be appreciated that various sensors, detectors, monitors, and the like may be arranged throughout the waste collection and processing system 100. For example, various configurations may include sensors for lid state (e.g., open/closed), air flow rates, air pressure, liquid and/or solid levels within the toilet 102 and/or waste tank 110, weight, or other sensors to detect fill level within the waste tank, valve state sensors (e.g., open/closed), temperature sensors, moisture sensors, and the like. Each of the sensors may be in arranged operable communication with the controller 112 to provide feedback and/or to enable automation of various aspects described herein. It will be appreciated that such sensors may be implemented with any of the herein described embodiments and such sensors are not merely limited to the embodiment and configuration shown and described with respect to FIG. 1.

Figure 2:
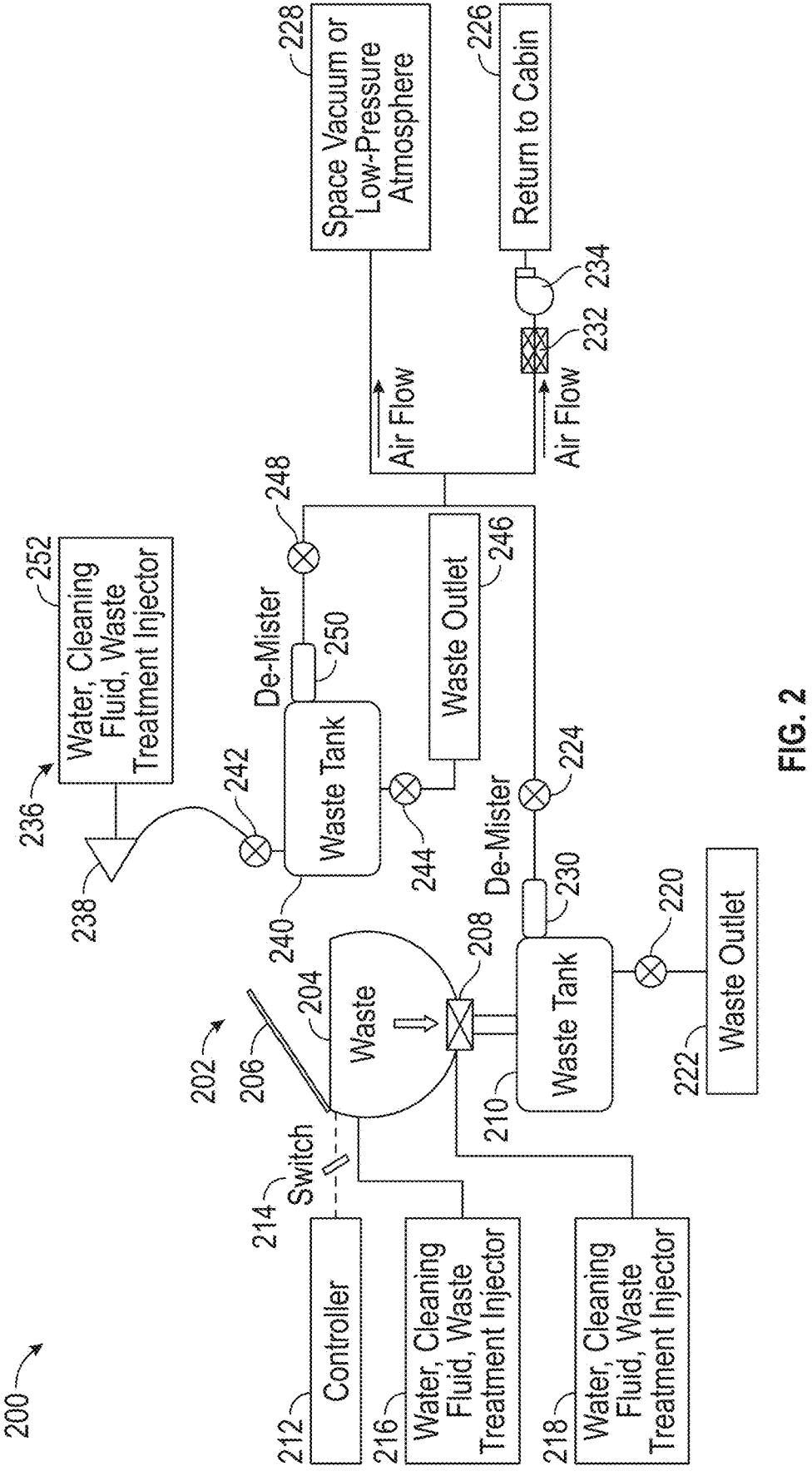
FIG. 2 is a schematic illustration of a second illustrative configuration of a waste collection and processing system in accordance with the present disclosure.

Referring now to FIG. 2, a schematic diagram of a waste collection and processing system 200 in accordance with another embodiment of the present disclosure is shown. The waste collection and processing system 200 may be similar to the configuration shown in FIG. 1, but with differences as shown and described herein. The waste collection and processing system 200 may be used aboard spacecraft or on a base or other structure on the surface of a non-Earth body (i.e., in low-gravity environments). Similar to the configuration shown in FIG. 1, the waste collection and processing system 200 includes a toilet 202 with a bowl 204 and a lid 206. Waste from the toilet 202 may be selectively directed from the bowl 204 into a first waste tank 210 (e.g., a solid waste tank) through a first valve 208 that is controlled by a controller 212. A switch 214 may be employed for control functionality, as described above. Similarly, one or more optional fluid injectors 216, 218 may be provided to inject water, cleaning fluid, waste treatment fluid, or the like, directly into the bowl 204 and/or to be mixed with the waste as it is transferred from the bowl 204 to the first waste tank 210.

Waste may be collected from the first waste tank 210 through a second valve 220 that selectively controls fluid connection between the first waste tank 210 and a first waste outlet 222, similar to that described above. In some configurations, the first waste tank 210 may be fluidly connected to an occupied space 226 (e.g., spacecraft cabin) via a flow path having a third valve 224 arranged thereon. In other embodiments, the first waste tank 210, in combination with the third valve 224, may be configured to direct treated or untreated gases to an external environment 228 (e.g., space, low-pressure atmosphere, etc.). In still further configurations, such as shown in FIG. 2, the system 200 may be configured to allow selective fluid to either or both of the occupied space 226 and the external environment 228. An optional de-mister 230 may be provided along the flow path exiting the first waste tank 210, as described above. In configurations or operations where air is to be directed back into the occupied space 226, the air may pass through a filter assembly 232 and a motive force may be provided by a pump 234, such as a vacuum pump.

The waste collection and processing system 100 of FIG. 1 is a combined collection system. However, in contrast, the waste collection and processing system 200 of FIG. 2 provides for two separate collection mechanisms or systems. The toilet 202 of the waste collection and processing system 200 of FIG. 2 may be configured to receive solid waste, or non-urine waste, although such solid waste deposit may include urine as well. However, if a user intends to only deposit liquid waste (e.g., urine), the waste collection and processing system 200 includes a dedicated system for such waste. As shown, the waste collection and processing system 200 includes a liquid waste collection system 236 which is arranged as a parallel system with the solid waste collection provided by the toilet 202.

The liquid waste collection system 236, as shown, includes a liquid waste receptacle 238 or other receiving device which is fluidly connected to a second waste tank 240 (e.g., a liquid waste tank). A fourth valve 242 is arranged between the liquid waste receptacle 238 and the second waste tank 240 (e.g., along a hose, conduit, or the like). The second waste tank 240 may be configured similar to that of the first waste tank 210, but may be configured to receive only liquid waste. As shown, the fourth valve 242 is arranged at an inlet to the second waste tank 240, and a fifth valve 244 is arranged between the second waste tank 240 and a second waste outlet 246. Further, as shown, a sixth valve 248 may be provided at an outlet from the second waste tank 240 to enable extraction of gases from the second waste tank 240, and may include an optional de-mister 250 at the outlet thereof, similar to the configuration of the first waste tank 210.

Similar to the configuration of FIG. 1, the waste collection and processing system 200 has three operating modes.

In a first operational mode (e.g., System Reset Operation), the controller 212 will control the first valve 208, the second valve 220, the fourth valve 242, and fifth valve 244 to be closed. The controller 212 will then control the third valve 230 and the sixth valve 248 to open (either separately or simultaneously). By opening only the third valve and/or the sixth valve 248, the respective waste tanks 210, 240 may be vented and reduced in pressure for subsequent use of the system 200. In configurations or operations where the waste collection and processing system 200 is configured to vent to vacuum or a low pressure atmosphere (e.g., external environment 229), air in the waste tanks 210, 240 is vented to external atmosphere and the waste tanks 210, 240 are brought to low pressure (or vacuum). If the waste collection and processing system 200 is configured to return the air to the occupied space 226, the controller 212 will activate the pump 234 to draw the air through the filter assembly 232, and the waste tanks 210, 240 are brought to low pressure (or vacuum). The controller 212 will then close the third valve 230 and the sixth valve 248. At this point, in either venting operation, the pressure within the waste tanks 210, 240 is lower than ambient pressure within the occupied space 226, and the system 200 is ready for use.

In a second operational mode (e.g., Waste Deposit Operation), airflow, gravity, or combinations thereof may be used to direct human waste deposited from user into the respective waste tanks 210, 240. As noted above, optionally, opening the lid 206 or, in this configuration, taking up the liquid waste receptacle 238, can actuate the switch 214 to activate the controller 212. This responsive action thus only activates the controller 212 and the system 200 as a whole, when a user will be depositing waste, thus reducing the duty cycle of the electronic components of the system 200. A user will make a deposit, similar to toilet use in terrestrial applications but with separate means of collection for urine (liquid waste receptacle 238) and non-urine waste (toilet 202). In the second operational mode, the fourth valve 242 can optionally be partially opened to provide a limited amount of air flow to assist with urine capture at the liquid waste receptacle 238. When a user has completed their waste deposit, a 'flush' action is activated, such as by a switch, toggle, foot pedal, or closing of the lid 206 or replacing the liquid waste receptacle 238 to a stowed location. When the 'flush' action is activated, the controller 212 will cause the first valve 208 and the fourth valve 242 to open, either individually or simultaneously. In some embodiments, only the valve 208, 242 that is associated with the location of the waste deposit will be opened. During the waste deposit, the bowl 204 and the liquid waste receptacle 238 will be exposed to atmospheric pressure (e.g., the occupied space 226). When the 'flush' is activated, the toilet 202 and/or the liquid waste receptacle 238 will be exposed to vacuum or low pressure in the respective waste tanks 210, 240. This will create a suction force, moving the waste into the respective waste tanks 210, 240. In some configurations, at the respective valves 208, 242 or within the respective bowl 204 or liquid waste receptacle 238, optional water, cleaning fluid, or waste treatment can be injected using fluid injectors 216, 218, 252. Once the waste has been moved into the respective waste tanks 210, 240, the first and fourth valves 208, 242 are closed and the controller 212 initiates the first operational mode (e.g., System Reset Operation). In some configurations of the waste collection and processing system 200, the system can also be operated in a way that collects urine and non-urine deposits at different times, or independently, with a different valve opening and closing procedure, without departing from the scope of the present disclosure.

In a third operational mode (e.g., Waste removal), waste is removed from the system 200. The waste removal operation may be controlled by the controller 212. In a first step, the second valve 220 and/or the fifth valve 244 are opened, and waste within the waste tanks 210, 240 may be pumped out (pump not shown) or the waste may exit the respective waste tanks 210, 240 by means of gravity. The waste collected at the respective waste outlets 222, 246 can be directed to waste reclamation hardware. The waste reclamation hardware may include, but is not limited to, urine processor(s), fecal waste processing bag(s), urine processing bag(s), heaters, evaporators, phase separators (e.g., solid, liquid, gas), or the like. In some embodiments, the waste tanks 210, 240 may be configured with rinsing capabilities that are initiated and operated at the completion of the third operational mode.

Figure 3:
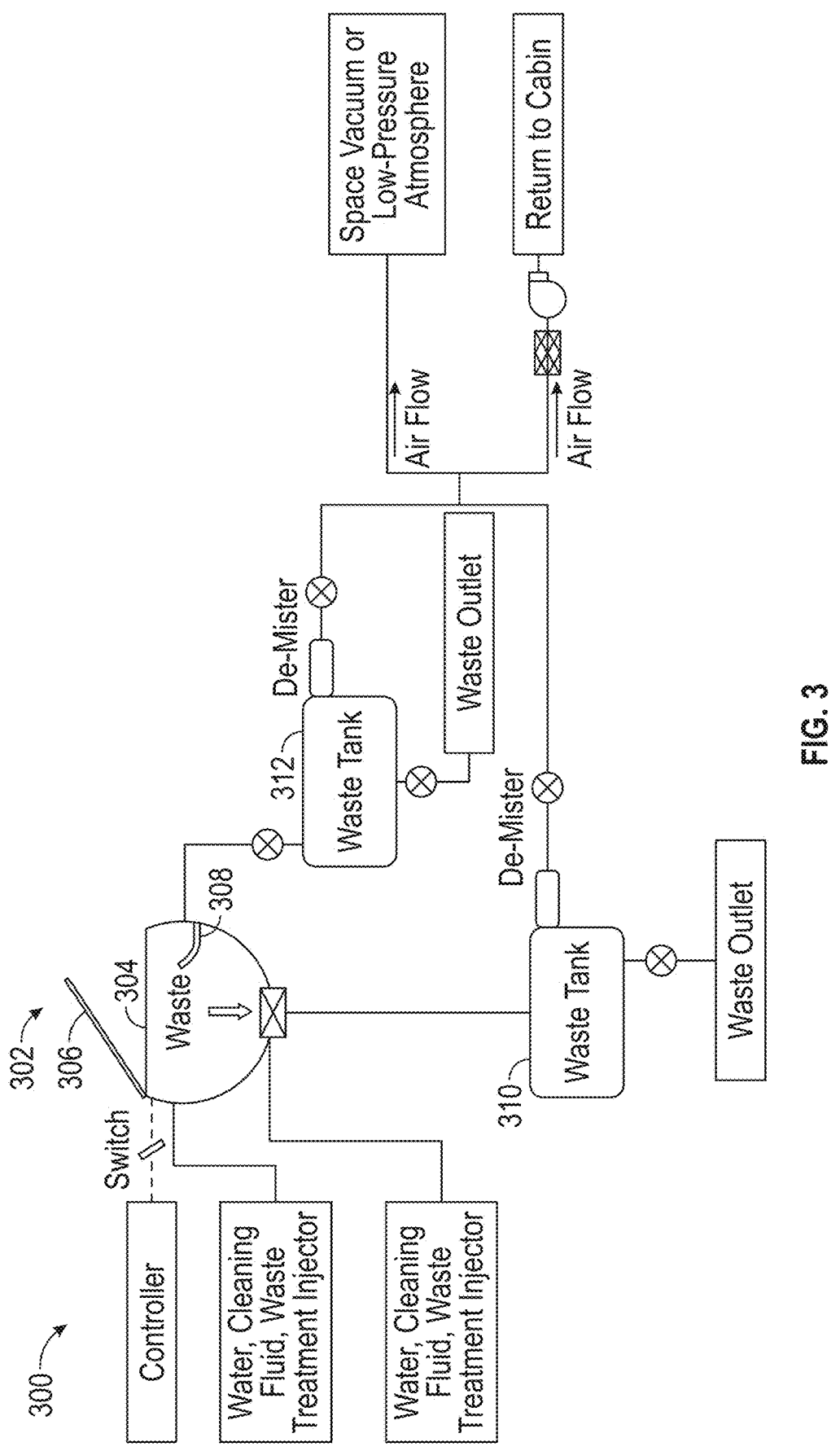
FIG. 3 is a schematic illustration of a third illustrative configuration of a waste collection and processing system in accordance with the present disclosure.

Referring to FIG. 3, a schematic diagram of a waste collection and processing system 300 in accordance with another embodiment of the present disclosure is shown. The waste collection and processing system 300 may be similar to the configurations shown in FIGS. 1-2, but with differences as shown and described herein. The similar features that are illustrated will not be described in detail again for brevity and clarity of differences, but it will be appreciated that unless otherwise stated, embodiments and aspects of the waste collection and processing system 300 may be substantially similar to or even identical to the above described embodiments.

The waste collection and processing system 300 is a dual-stream configuration, similar to that shown and described with respect to FIG. 2, but having only one waste collection component (i.e., a toilet 302). In this configuration, the toilet 302 includes a bowl 304 and a lid 306 with a urine capture element 308 arranged within the bowl 304. The urine capture element 308 is arranged to ensure separation of liquid waste (urine) from solid or other human waste which will be collected in the bowl 304. Once the urine is deposited into the urine capture element 308 and other waste is deposited into the bowl 304, the operational modes described with respect to FIG. 2 are substantially the same, and thus description thereof will not be repeated. That is, the solid and/or non-urine waste may be collected into and processed from a first waste tank 310 (e.g., solid waste tank) and the urine waste may be collected into and processed from a second waste tank 312 (e.g., liquid waste tank).

Figure 4:
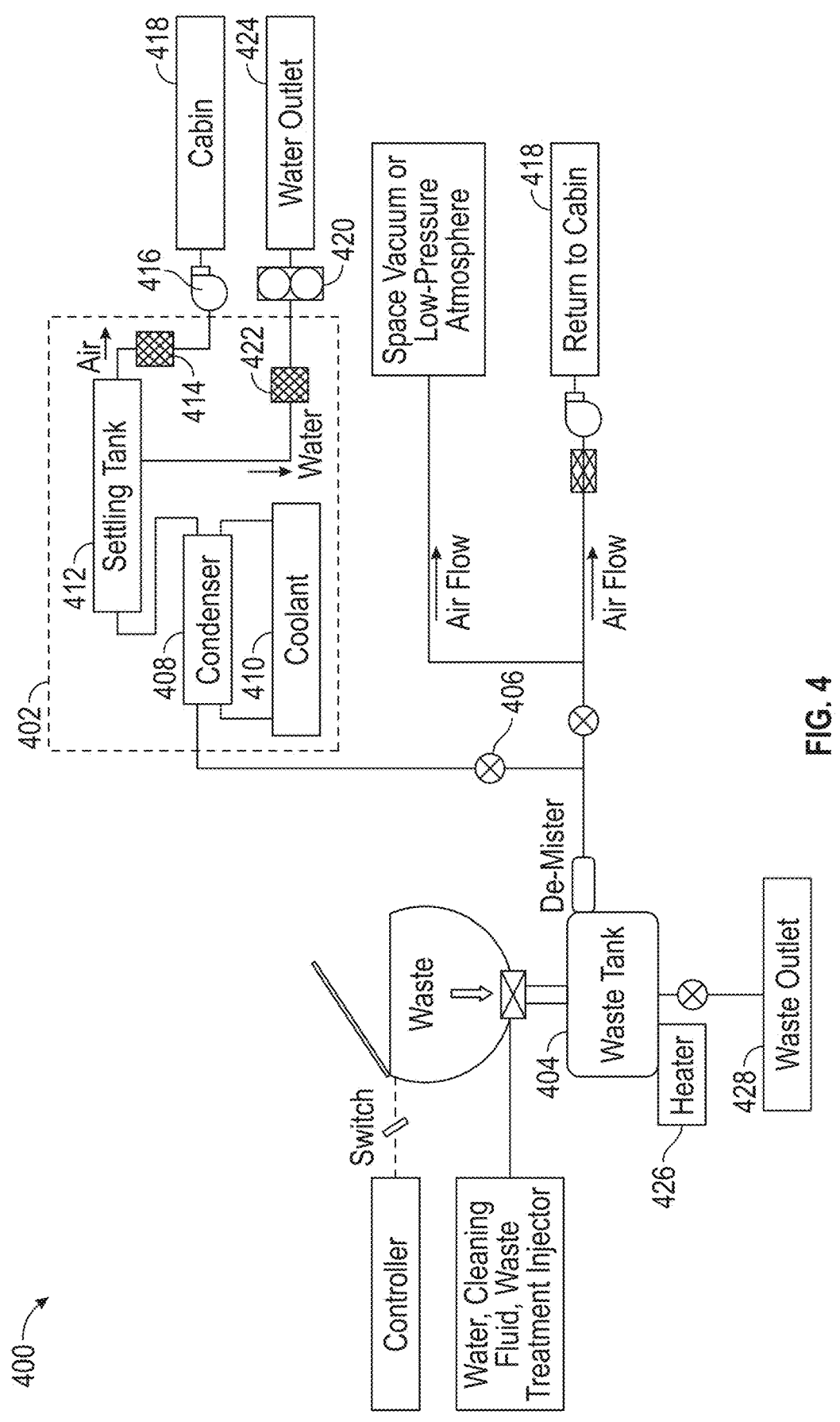
FIG. 4 is a schematic illustration of a fourth illustrative configuration of a waste collection and processing system in accordance with the present disclosure.

Referring to FIG. 4, a schematic diagram of a waste collection and processing system 400 in accordance with another embodiment of the present disclosure is shown. The waste collection and processing system 400 may be similar to the configurations shown in FIGS. 1-3, but with differences as shown and described herein. The similar features that are illustrated will not be described in detail again for brevity and clarity of differences, but it will be appreciated that unless otherwise stated, embodiments and aspects of the waste collection and processing system 400 may be substantially similar to or even identical to the above described embodiments. The primary features shown and labeled in FIG. 4 are related to a waste reclamation system 402 that is incorporated into the waste collection and processing system 400. The waste reclamation system 402 may be provided to process waste deposited into the system 400 by a user and enable reclamation of portions of the waste (e.g., breathable air, water, etc.).

Similar to the above described configurations, the waste collection and processing system 400 includes a waste tank 404 that is selectively fluidly connected to the waste reclamation system 402 by a valve 406. The waste reclamation system 402 includes a condenser 408 (e.g., a condensing heat exchanger) that is thermally coupled to a coolant loop 410, or the like. The condenser 408 is arranged to cool a fluid flow received from the waste tank 404 as it flows through the waste reclamation system 402. The condenser 408 will cool the fluid and condense moisture (e.g., water) from the fluid flow. The cooled flow, which may include both gases and liquid water or other liquids, may then be directed into a settling tank 412, where the liquid and gas components may separate. The settling tank 412, in some configurations, may be replaced by or arranged in connection with a phase separator or similar component, as will be appreciated by those of skill in the art. However, use of the settling tank 412 along may provide for a low complexity, passive system for separation of liquid and gases output from the waste tank 404.

Dry air may be passed from the settling tank 412 through an air scrubber 414 (or other gas processing system/apparatus) and then the treated air may be directed by a fan 416 into an occupied space 418, or the like. The liquid portion (e.g., water) may be pulled out of the settling tank 412 by a pump 420 and the liquid is passed through a liquid scrubber 422 (or other liquid processing system/apparatus) and then the treated liquid may be directed through a liquid outlet 424. The liquid outlet 424 may be connected to a water storage tank or other water-based system onboard a spacecraft or the like. It will be appreciated that the air scrubber 414 and/or the liquid scrubber 422 may be configured with filters, chemical processing hardware, or the like. When the waste reclamation system 402 is not operated or used, the system 400 provides for fluid connection between the waste tank 404 and a return flow to the occupied space 418 or to an external environment, as described above.

As shown in FIG. 4, an optional heater 426 may be operably connected to the waste tank 404 to provide heating thereto. The application of heat to the waste tank 4040 may increase an efficiency of the waste reclamation system 402 by evaporating liquid within the waste tank 404 prior to drawing the gases from the waste tank 404 into the waste reclamation system 402. Although the waste reclamation system 402 is illustratively shown as receiving an airflow from the waste tank 404, it will be appreciated that a similar waste reclamation system may be provided at a waste outlet 428 that is output from the waste tank 404. In other configurations, the output at the waste outlet 428 may be directly connected to the same waste reclamation system 402 as that which receives the air to be treated for water reclamation, as described above. As such, in some embodiments, the waste reclamation system 402 may be configured to process both gaseous output and solid/liquid output from the waste tank 404.

In the above described embodiments, a pump or other low pressure or vacuum source may be arranged to generate a low pressure within the waste tanks. This low pressure is used to pull waste from a toilet bowl or other receptacle and cause gas, liquid, and solid waste to be pulled from the receptacle into one or more waste tanks. It will be appreciated that, in some embodiments, such pump may not be necessary, such as by exposing the waste tank(s) to a low pressure atmosphere or vacuum of space.

In accordance with some embodiments of the present disclosure, waste collection and processing systems may be arranged as single stream collection commodes with waste storage and processing capability. In use, waste may be collected from the user with an assisting airflow to pull the waste into the respective receptacle, and, in some embodiments, may be assisted by bowl geometry or the like. The waste may then be separated using various materials, structure, and/or membrane configurations, where solid and liquid waste are captured and gases are allowed to pass through the material/structure/membrane, within the respective waste tank. In some configurations, the waste tank(s) may be configured with heaters or other mechanisms to evaporate water from the collected waste and enable reclamation of the water from the waste. The heating operation may also prepare solid waste remnants (e.g., after gases and liquids have been extracted) for safe storage or disposal. Some such configurations may include an alternating processing chamber architecture to treat and/or remove gases, liquids, and solids. Such systems may be capable of use in environments imposed by Low Earth Orbit and Deep Space applications (e.g., low or no gravity, increased radiation, etc.). In accordance with some embodiments, simultaneous waste stream collection (e.g., liquids and solids) with intuitive human interface may be provided, such as with modified receptacles, or the like. Accordingly, systems of the present disclosure may reduce required crew interaction relative to conventional systems, thus increasing safety and cleanliness. Furthermore, some embodiments of the present disclosure allow for water recapture from all forms of human waste (e.g., urine, feces, vomit, menses, etc.). In accordance with some embodiments, separate waste collection and/or water recapture may be employed with various configurations shown and described herein. For example, and without limitation, such separate waste collection and/or water recapture may be incorporated as shown in FIGS. 2-3.

Figure 5:
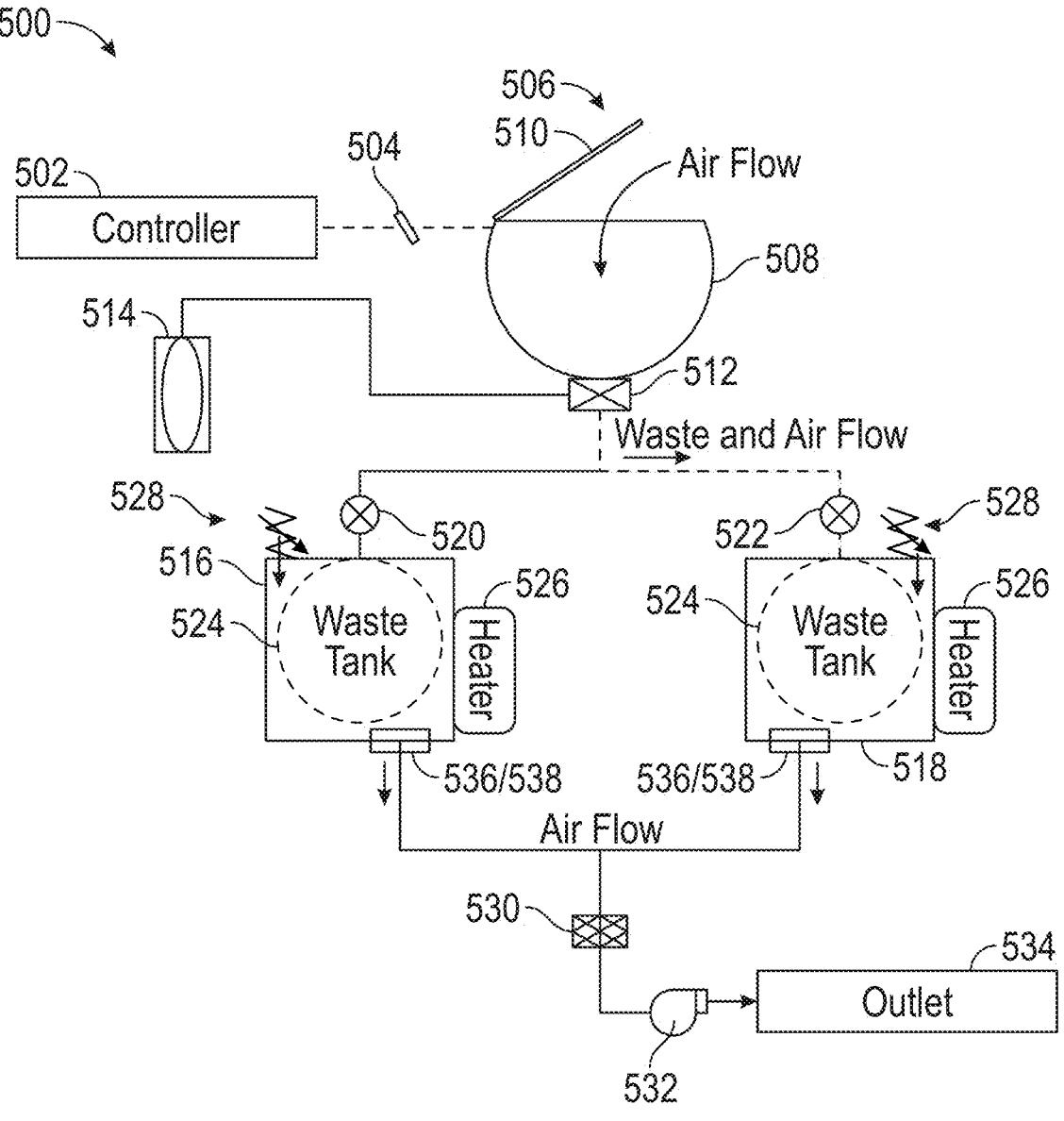
FIG. 5 is a schematic illustration of a fifth illustrative configuration of a waste collection and processing system in accordance with the present disclosure.

Referring now to FIG. 5, a schematic diagram of a waste collection and processing system 500 in accordance with another embodiment of the present disclosure is shown. The waste collection and processing system 500 includes a controller 502, a switch 504, and a toilet 506 having a bowl 508 and a lid 510, similar to that shown and described above, and thus the details of which will not be repeated again. At the outlet of the bowl 508 is a selectively operable first valve 512 that is configured to be controlled by the controller 502. As shown, a fluid injector 514 may be provided to inject water, cleaning fluid, waste treatment fluid, or the like, directly into the bowl 508 and/or to be mixed with the waste as it is transferred from the bowl 508 to a waste tank of a pair of waste tanks 516, 518. Although two waste tanks 516, 518 are illustratively shown, it will be appreciated that more than two waste tanks may be employed without departing from the scope of the present disclosure.

The waste tanks 516, 518 are configured to be selectively operated between a reclamation operation and a collection or containment operation. In the system 500, one of the waste tanks 516, 518 may be operated in a reclamation mode of operation while the other waste tank 516, 518 is operated in a collection or containment mode of operation. In the illustrative configuration, a first waste tank 516 is shown in the reclamation mode of operation and a second waste tank 518 is shown in the collection mode of operation. As noted, the operational state of the two waste tanks 516, 518 may be selectively switched, such that the first waste tank 516 may be operated in the collection mode of operation and the second waste tank 518 may be operated in the reclamation mode of operation.

When the first waste tank 516 is in the reclamation mode, and as shown in FIG. 5, a second valve 520 arranged between the first valve 512 and the first waste tank 516 is closed, thus preventing fluid communication between the toilet 506 and the first waste tank 516. When the second waste tank 518 is in the collection mode, and as shown in FIG. 5, a third valve 522 is open, allowing for waste from the toilet 506 to be directed into the second waste tank 518. In some embodiments, the second and third valves 520, 522 may be replaced by a directional three-way valve, and the distinct valve arrangement illustrated herein is intended only for explanatory purposes, and is not intended to be limiting to the valve configurations that may be used with embodiments of the present disclosure. The controller 502 may be configured to control operation of the valves 512, 520, 522. In this configuration, each of the waste tanks 516, 518 includes a waste bag 524 arranged within the respective waste tank 516, 518. The waste bags 524 are configured to capture liquid and solid waste, but is permeable to gases that are part of the waste that is deposited into the waste bags 524. As such, the gasses of the waste may be extracted, reclaimed, and recycled for use. In some embodiments, the waste bags 524 may be configured as a multi-membrane bladder or the like.

Each of the waste tanks 516, 518 may include an optional heater 526 that is arranged to promote extraction of gases, and potentially water, from the waste in the waste bags 524 within the respective waste tanks 516, 518. In various embodiments, the optional heaters 526 may be placed on the outside of the respective waste tanks 516, 518, inside the waste tanks 516, 518, upstream of the waste tanks 516, 518 on a fluid line between the toilet 506 and the waste tanks 516, 518, and/or on or at air inlets or pressure relief valves 528 that are associated with the waste tanks 516, 518. Further, it will be appreciated that multiple separate heaters may be arranged at multiple locations to ensure desired heating of the waste stream or captured waste. In some configurations, and as shown, air from an occupied space (or from a dedicated supply) may be passed or forced through the waste tanks 516, 518 from the respective air inlets 528. In some embodiments, the air supplied through the air inlets 528 may be openings that are always open, thus allowing constant flow of air to pass through the waste tanks 516, 518. In other configurations, the air inlets 528 may include operation valves (e.g., pressure relieve valves, controllable orifices, etc.) that are selectively operated to allow air to enter and flow through the respective waste tanks 516, 518, depending on the mode of operation and the specific configuration of the waste collection and processing system 500.

The waste bags 524 may be removable from the respective waste tanks 516, 518, and replaceable. In some embodiments, the waste bags 524 are a consumable or disposable element, and in other embodiments, the waste bags 524 may be processed and reused, depending on the specification configuration and application of the system 500. The waste bags 524 can be removed from the waste tanks 516, 518 to remove collected solid and/or liquid wastes for disposal outside of the waste collection and processing system 500. The removal of the waste bags 524 may be based on a fill level of the waste bags 524 or based on a schedule, or some other reason.

As shown, downstream from the waste tanks 516, 518 is an air filter assembly 530 for treating air pulled from the waste tanks 516, 518. A fan 532 may be used to provide a motive force to pull air from the surrounding environment or space in which the waste collection and processing system 500 into and through the system 500. The air pulled through the system 500 by the fan 532 may enter through the toilet 506 (e.g., when the lid 510 is open and the first valve 512 is open) and through the waste tanks 516, 518. In some embodiments, such as shown, that include the air inlets 528 on the waste tanks 516, 518, air may be pulled through such air inlets 528 and through the respective waste tanks 516, 518. In either configurations, the air and any gases that mix with the airflow within the waste tanks 516, 518 may be directed into and through the air filter assembly 530 to generate treated air. The treated air may then be provided into a moisture capture system for water reclamation and/or other processing equipment and/or may be directed back into an occupied space as indicated at system outlet 534.

The waste collection and processing system 500 provides for waste collection, similar to that described above, along with additional processing functionality built into the system 500. The toilet 506 may be configured similar to that shown and described above with respect to FIGS. 1-4. The toilet 506 may have a geometry designed for directing airflow into and through the bowl 508 and direct waste (gases, liquids, solids) from the human user into the bowl 508 and the rest of the system 500. The first valve 512, arranged at an outlet of the bowl 508, is operable to isolate the toilet 506 from the remainder of the system, which may be provided to enable the various modes of operation, as described herein. The system 500 can include features to enable injection of waste treatment fluid(s) or water for waste treatment and system rinse (e.g., fluid injectors 514). Various other features may also be implemented in this and the other embodiments described, particularly for systems that incorporate waste bags. The waste bags 524, as noted above, are selected to be permeable to gas, but are impermeable to liquids and solids, thus allowing for capture of liquid/solid waste, and enabling recapture of gases. In some embodiments, the waste bags 524 may be pretreated bags or containers with chemicals and/or coatings for containing, processing, and otherwise handling waste deposited into the waste bags 524. In some configurations, treatment of waste at the outlet of the bowl 508 and prior to depositing into the waste tanks 516, 518 may include a flow over pearls, fluid injection between the bowl 508 and the waste tanks 516, 518, and/or fluid injection at the bowl 508 itself as a bowl rinsing mechanism. Other treatments and/or pre-treatment applications and operations may be performed without departing from the scope of the present disclosure.

In additional to the waste collection, described above, the waste collection and processing system 500 also provides for waste storage and recycling functionality. As shown and noted above, two or more waste tanks 516, 518 are provided that each contain respective waste bags 524. The waste bags 524 allow for the capture of solid and liquid waste, but flow-through of gases (e.g., air and humidity). The waste tanks 516, 518 may be configured to operate on a cycle that is manually controlled or may be controlled by the controller 502. The operational cycle of the operational states of the waste tanks 516, 518 is designed such that the functions of each waste tank 516, 518 is interchanged at an interval that allows for one or more of the waste tanks 516, 518 (or one or more waste bags 524) to be collecting waste while the other waste tanks 516, 518 (or waste bags 524) in the system 500 are used to reclaim water and other byproducts from the waste and prepare the waste for storage once the waste bag is filled and/or removed from the respective waste tank 516, 518. Water reclamation is performed by passing air over or through the waste bags 524, which allow gaseous water to move through the material of the waste bags 524 and enter into an air stream that flows through the system 500 (e.g., from the bowl 508 and/or the air inlets 528. The water extracted from the waste may then be removed from the air stream. The waste bags 524 may be removable, and may be configured to be sealable when the waste bags 524 are removed from the respective waste tanks 516, 518. Once removed, new or empty replacement waste bags 524 may be installed to replace a removed (e.g., filled) waste bag 524.

In some embodiments, the optional heaters 526 may be used to apply heat to the air stream, the waste bags 524, and/or the waste tanks 516, 518 to reduce the time required to reclaim water from waste. That is, application of heat from the heaters 526 can cause evaporation of gases and water from the waste collected within the waste bags 524.

The waste tanks 516, 518 may be designed for manual or automated removal of the waste bags 524 after stabilization and water recapture from waste within the waste bags 524. In some configurations, the waste tanks 516, 518 may include optional secondary filters and waste capture hardware 536 at the outlet of the respective waste tank 516, 518. Furthermore, the waste tanks 516, 518 may include optional valves 538 at the outlet thereof, which may be selectively closed to fluidly isolate the respective waste tank 516, 518.

Downstream from the waste tanks 516, 518, the waste collection and processing system 500 can include an optional air and humidity processing system or assembly. For example, as shown, the filter assembly 530 may be arranged immediately downstream from the waste tanks 516, 518. The filter assembly 530 is configured to condition or otherwise treat air as it leaves the waste tanks 516, 518. The fan 532 is provided to create a motive force of a flow of air through the system 500. In accordance with various embodiments, the 532 530 may be a variable speed fan, a step speed fan, a single speed fan, or multiple fans of one or more types. Additional hardware at the outlet of the system 500 can be added to reclaim moisture from the air. For example, moisture reclamation systems may include regenerative heat exchangers, heat exchangers that interface with other cooling source(s)/systems, phase separators for use in low-gravity environments to separate condensate from dry air, filters, membranes, chemical beds, or other hardware for air and/or water processing, or the like as will be appreciated by those of skill in the art.

In the system 500, during a waste deposit operation, airflow, generated by the fan 532, pulls the waste into an active or operational waste tank (in this illustration, second waste tank 518). During the waste deposit operation, and as illustratively shown, the second waste tank 518 is active and open for waste collection, and the first waste tank 516 is closed and able to perform reclamation operations for waste that may be contained in a waste bag 524 within the first waste tank 516. As such, a flow path of waste and gases will be from the bowl 508, into the active second waste tank 518, and then out of the active second waste tank 518, and inactive first waste tank 516 is isolated from such a flow.

The active second waste tank 518 is open to the flow because the third valve 522 is open. In contrast, the closed first waste tank 516 is isolated because the second valve 520 is closed. With the first waste tank 516 isolated form the flow, the first waste tank 516 may be operated in a reclamation mode of operation, where waste contained within a waste bag 524 within the first waste tank 516 is treated or processed to extract and reclaim water and/or air, while preparing the waste for storage or disposal. In some configurations, the act of opening the lid 510 for use will actuate the switch 504 to activate the controller 502, thus limiting the duration that electronics are operated in an ON state.

The controller 502 is configured to direct the first valve 512 and the third valve 522 to open and to operate the fan 532 to generate a flow of air through the toilet 506, through the second waste tank 518, and to the system outlet 534. In some embodiments, the fan 532 may be a single speed fan or the like, with an on and off state. In other embodiments, the fan 532 may be a multi-speed or variable speed fan, having at least a low speed operation and a high speed operation. When the fan 532 is operated, air flow will cause a flow of air to be directed into and through the active containment tank (i.e., second waste tank 518). The user will deposit waste into the bowl 508, and the deposit is captured by the airflow within the bowl 508. The airflow will carry or cause the waste to move through the first valve 512 and the third valve 522 to enter the active containment tank (i.e., second waste tank 518), where waste is captured by the waste bag 524 within the second waste tank 518. The airflow continues to flow through the second waste tank 518 and toward an outlet of the system 500. The air will exit the active waste tank and be processed or treated in the filter assembly 530 and to the system outlet 534. Once a user has completed the waste deposit, the lid 510 is closed. When the lid 510 is closed, an optional rinse operation is performed to clean and/or rinse the bowl 508 of the toilet 506. The rinse fluid can be water, waste treatment fluid(s), cleaning fluid(s), sanitizing or disinfecting fluids, or the like. After closure of the lid 510, and after an optional rise operation, the waste and rinse fluids may be pulled out of the toilet 506. Once the waste and fluids are removed from the toilet 506, such as after a preset run time for the fan 532, the first valve 512 and the third valve 522 are closed, and the fan 532 is powered down or set to a low flow state.

In a waste recycle or reclamation mode of operation of the system 500, airflow is provided over an optionally heated waste bag 524 in a waste tank 516, 518. In some configurations, the waste recycle operation may be performed simultaneously with the waste deposit operation, but performed on the inactive waste tank. The waste recycle operation may be performed to collect moisture from waste and/or cleaning fluids from the waste bags 524. In the waste recycle operation, the fan 532 is powered on (either by the controller 502 or a fan specific controller) to pull air through the waste tank that is in the reclamation mode of operation. In this operation, the second valve 520 is closed (i.e., no fluid connection between the toilet 506 and the first waste tank 516. Further, in some configurations of this operation, the third valve 522 may also be closed, resulting in no fluid communication between the toilet 506 and both waste tanks 516, 518. The air inlet 528 on the waste tank 516, 518 that is reclamation mode (or both tanks if not in active use such as during waste deposit) open to allow air flow over the waste bag(s) 524 within the waste tanks 516, 518. It will be appreciated that the air inlet 528 on the waste tanks 516, 518 may be configured as valves, pressure relief valves, solenoid valves, variable orifices, or the like to allow for air to be pulled into and through the waste tanks 516, 518 to capture moisture that is extracted from waste in the waste bags 524. In some embodiments, the air inlets 528 may be configured as one-way airflow permeable vents or inlets to allow airflow to constantly be pulled through the respective waste tanks 516, 518. Alternatively, or in addition thereto, during the reclamation mode of operation, one or more of the valves 512, 520, 522 may be opened (fully or partially) to increase the airflow through the waste bag(s) 524 during the reclamation mode of operation. In some such configurations, the toilet 506 may include vents or the like to allow for an airflow from the toilet 506 to pass through the waste tanks 516, 518.

As noted above, the optional heaters 526 may be provided on the waste tanks 516, 518, and/or directly to the waste bags 524, and/or at the air inlets 528, and/or at other locations within the system 500. Application of heat from the heaters 526 may expedite water evaporation from waste within the waste bags 524 and may also provide a mechanism to sanitize the waste contained within the waste bags 524. As the fan 532 is operated, the induced air flow will carry moisture from the waste through the elements 536, 538 at the outlet of waste tanks 516, 518, through the filter assembly 530, and then out of the system 500 at the system outlet 534 (e.g., reintroduced into an occupied space or into moisture capture hardware).

When full, the waste bags 524 may be removed and replaced with an empty bag. It will be appreciated that being full is not a requirement for removal, as a less-than-full waste bag 524 may also be removed, such as based on a schedule, escaping odors, a maintenance operation, for other reasons or at other appropriate time. When the waste bags 524 are to be removed and replaced with an empty bag, the designated waste tank 516, 518 may be opened to allow for the removal of the waste bag 524 and any collected/captured waste therein. The waste may be at least partially treated by fluids (e.g., from fluid injector 514) and/or application of heat from the heaters 526. That is, the fluids provided from the fluid injector(s) 514 may include chemicals that are selected to kill bacteria, breakdown solids, reduce odor generation, or the like, and thus the fluids may be used both for cleaning/rinsing, and for treating collected waste. Further, as noted above, the heaters 526 may provide sanitizing functionality and/or other thermal processing of the waste within the waste bags 524. The opening of the waste tanks 516, 518 may be achieved through manually opening a door or the like, electromechanically operating a door or performing a removal operation, electronically controlling elements or functions of the waste tanks 516, 518 by the controller 502, or the like. In some configurations, the waste bags 524 may be configured to automatically seal upon removal from the respective waste tank 516, 518. In some embodiments, an automated process may be employed where a filled waste bag 524 is closed up and dropped into a collection bin or the like, and an empty bag is moved into place within the respective waste tank 516, 518. As such, direct human interaction with filled waste bags may be avoided. In some waste bag removal operations, the fan 532 may be operated to reduce stagnant air and pull any potential resulting odors through the filter assembly 530 during removal of the waste bag 524 from the waste tank 516, 518. Once removed, a new waste bag 524 may be installed in the respective waste tank 516, 518.

As discussed above, one waste tank 516, 518 will be operated in an active or collection mode and the other waste tank 516, 518 will be operated in an reclamation mode. In some configurations, the waste tank that is operated in the active or collection mode may be operated in such mode until the waste bag therein reaches a predetermined capacity or is considered full. During this time, the active/collection mode waste tank may also perform reclamation operations when not being used for waste deposit. In some embodiments, the two (or more) waste tanks may be cycled in a pattern, such as after a use, the tanks will change operation, such that waste is deposited into each of the bags in sequence. This operational scheme may provide for improved waste processing and reclamation by increasing the amount of time that a given waste tank is in the reclamation mode of operation, and may prevent build up of untreated waste within a given waste tank. It will be appreciated that other operational schemes may be employed without departing from the scope of the present disclosure.

Figure 6:
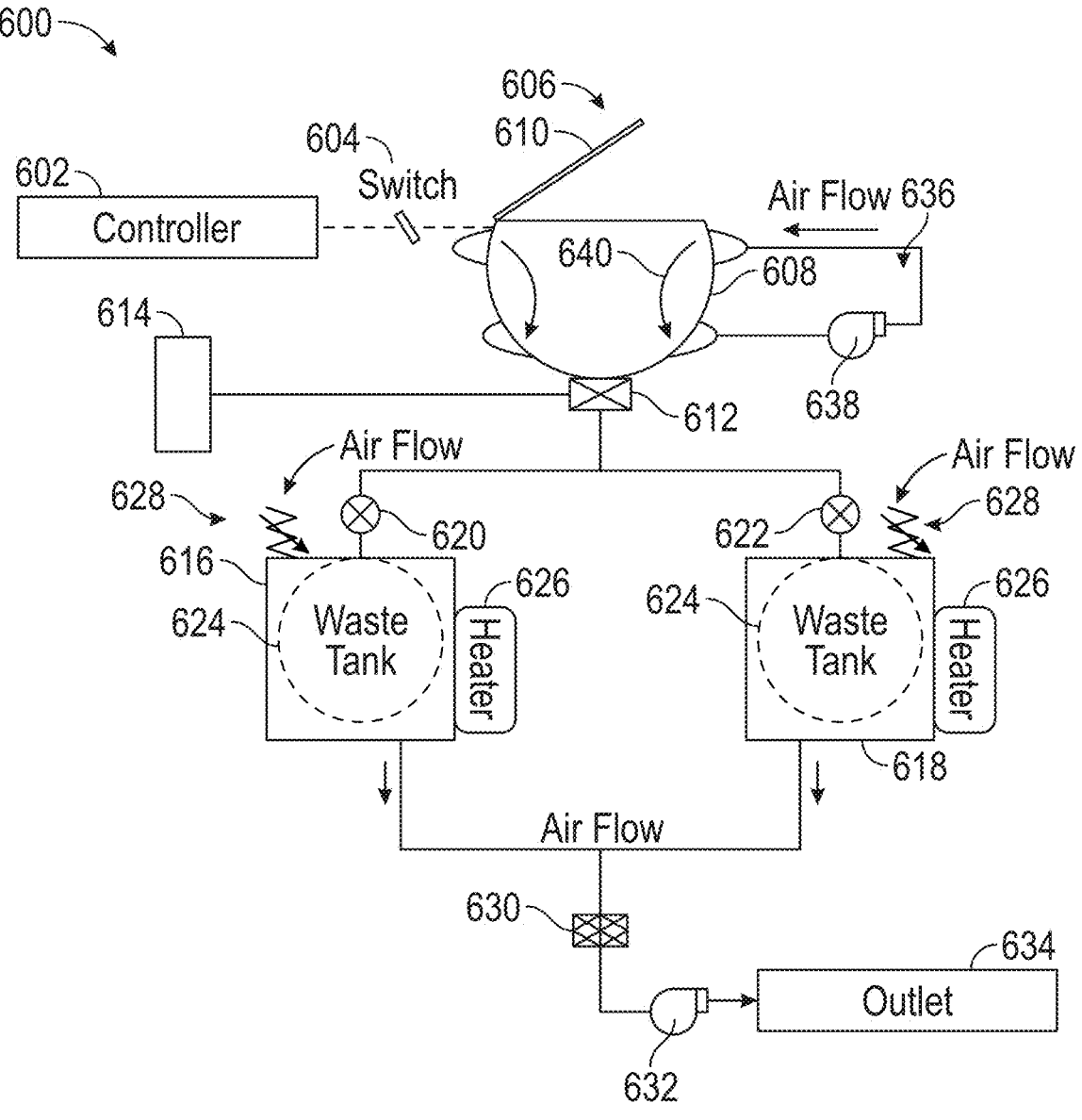
FIG. 6 is a schematic illustration of a sixth illustrative configuration of a waste collection and processing system in accordance with the present disclosure.

Referring now to FIG. 6, a schematic diagram of a waste collection and processing system 600 in accordance with another embodiment of the present disclosure is shown. The waste collection and processing system 600 includes a controller 602, a switch 604, and a toilet 606 having a bowl 608 and a lid 610, similar to that shown and described above. Similar to the embodiment of FIG. 5, at the outlet of the bowl 608 is a selectively operable first valve 612 that is configured to be controlled by the controller 602. A fluid injector 614 is arranged to inject water, cleaning fluid, waste treatment fluid, or the like, directly into the bowl 608 and/or to be mixed with the waste as it is moves from the bowl 608 to a set of waste tanks 616, 618 (which may be two or more waste tanks). In this illustrative configuration, at the inlet to the first waste tank 616 is a second valve 620, and at the inlet to the second waste tank 618 is a third valve 622. Each waste tank 616, 618 has a respective (removable/replaceable) waste bag 624 and a heater 626 associated therewith, as described above. Similarly, air inlets 628 may be provided on each waste tank 616, 618 to enable air throughflow, as described above, which may be configured as vents, valves, or the like. The waste tanks 616, 618 may be configured to alternate operational modes, such as described with respect to FIG. 5, and thus a described of the operational modes will not be repeated. However, it will be appreciated that in operation, one waste tank 616, 618 may be operated in an active/collection mode, and the other waste tank 616, 618 may be operated in a reclamation mode. Downstream from the waste tanks 616, 618 is a filter assembly 630, a first fan 632, and an outlet 634. At the outlet 634, the system may include moisture capture, air quality treatment and processing, or the like, for redirecting air into an occupied space, or may be vented or otherwise used onboard a craft, as described above with respect to FIG. 5.

In the waste collection and processing system 600 of FIG. 6, the system 600 includes a two-stage airflow configuration for providing a motive airflow for waste capture at/in the toilet 606 and a motive airflow for drawing waste (solid, liquid, gas) from the toilet 606 and through the waste tanks 616, 618 as described above. In this configuration, a relatively low airflow may be induced through the waste tanks 616, 618 during collection of waste while a relatively higher airflow is induced within or at the human interface where waste is deposited (e.g., at the toilet 606). The waste collection and processing system 600 includes waste capture airflow system 636 which includes a second fan 638. The waste capture airflow system 636 is integrated with the toilet 606 such that the second fan 638 can generate a flow of air through the bowl 608 in a direction of the first valve 612 to aid in capturing and directing human waste from a user into the system for capture, collection, and processing. A relatively higher or increased airflow rate may be required to direct and/or waste during the waste deposit/capture phase. In contrast, during the reclamation phase, airflow is only required to ensure relatively dry air is provided and supplied into contact with the waste and/or waste bag within the waste tanks 616, 618. In accordance with some embodiments, the lower flow rate of the reclamation phase may be significantly lower than that of the deposit/capture phase.

However, it will be appreciated that in some embodiments, a relatively high airflow rate may be employed during reclamation (i.e., a single speed fan or the like). In such configurations, the higher flow rate of the reclamation may result in higher power requirements and more noise (e.g., single speed fan capable of deposit/capture), which may be undesirable. Therefore, higher airflow rates are typically reserved for when such flow rates are functionally required (i.e., during capture/deposit). For example, and without limitation, the capture airflow rate may be 2-10 times greater than the reclamation airflow rate. In some non-limiting embodiments, the capture/deposit airflow rate may be about 15-30 cubic feet per minute (CFM) and the reclamation airflow rate may be about 5 CFM.

When using the waste collection and processing system 600 during a waste deposit operation, airflow from the waste capture airflow system 636 directs human waste from the user toward an outlet of the bowl 608 and into the currently active waste tank 616, 618 (i.e., the one in active or collection mode), while the other waste tank 616, 618 may be operated in the reclamation mode of operation. For example, by opening the lid 610, the switch 604 may be activated to activate the controller 602 which in turn may activate the waste capture airflow system 636. The controller 602 may be configured to direct the first valve 612 and the third valve 622 (to the active waste tank) to remain closed or only open slightly. The controller 602 activates the second fan 638 (of the waste capture airflow system 636) to generate a capture airflow 640. For example, the second fan 638 may be operated a high flow state or an on state, if it is a single speed fan, to generate the capture flow 640. The capture airflow generated by the second fan 638 will capture and/or direct waste toward the active waste tank 616, 618. For example, a user will make a waste deposit, and the waste is captured by the capture airflow 640 within the bowl 608, thus preventing waste from splashing or otherwise leaving the bowel 604 at the opening with the lid 610. The capture airflow 640 carries the waste toward an outlet of the bowl 608 (e.g., proximate the first valve 612). The user will then close the lid 610. As an optional step, a rinse operation may be performed to rinse the bowl 608 and direct any waste stuck to the bowl 608 to be collected and directed to the waste tank(s) 616, 618. The rise operation may include rinsing with water, a waste treatment fluid, a sanitation or cleaning solution, or the like. After the lid 610 is closed, and the optional rinse is performed, the first valve 612 and the third valve 622 are opened. The second valve 620 remains closed due to the first waste tank 616 is operated in the reclamation mode. With the valves 612, 622 open, the second fan 638 of the airflow capture system 636 may be powered down or transitioned into a low flow state, and the first fan 632 is powered on. Airflow induced through the waste collection and processing system 600 by the first fan 632, and optionally the second fan 638, will direct the waste to the active waste tank 618 (in this case). Once the waste is collected in the waste bag 624 of the second waste tank 618, the first and third valves 612, 622 are closed, and both fans 632, 638 are powered down.

In a waste recycle operation of the waste collection and processing system 600, airflow is directed over an optionally heated waste bag 624 in the first waste tank 616 which is in the reclamation mode of operation. It is noted that both waste tanks 616, 618 may be operated in the reclamation mode simultaneous, although individual or separate operation is also possible. It is noted that the reclamation mode may be stopped and one waste tank transitioned into active mode when a user opens the lid 610 or otherwise begins use of the system 600. The airflow induced by the fans 632, 638 will cause moisture and gases from waste in the waste bag(s) 624 to be drawn out of the waste bag(s) 624 such that water may be recaptured. In example of such operation, the first fan 632 is powered on (either by the controller 602 or a fan-specific controller). The second and third valves 620, 622 are closed, such that airflow cannot be pulled through or from the toilet 606. As such, in this specific example, the second fan 638 may not be operated during this operation. The air inlets 628 on the waste tanks 616, 618 provide an inlet for air to enter the respective waste tanks 616, 618, even with the valves 620, 622 being closed. The air drawn through the air inlets 628 will flow over the waste bag(s) 624 within the waste tanks 616, 618. This airflow will pass over the waste bags 624 and pull moisture and air therefrom. In some configurations, the optional heaters 626 may be activated to expedite water evaporation from waste and sanitize waste within the waste bag(s) 624. In some configurations, the air inlets 628 on the waste tanks 616, 618 may be selectively operable (e.g., open and closed) to allow for moisture capture from only one tank at a time. Thus, in some configurations, the air inlets 628 may be configured as solenoid valves or some other active element that can control air to flow into and through the waste tank(s) 616, 618. The induced airflow by the first fan 632 will carry the moist air to the outlet 634 of the system 600 (for recirculation and/or moisture recapture).

In a removal and replacement operation of the waste bags 624, the waste tanks 616, 618 may be opened to allow for the removal of the waste bag(s) that contain processed waste. The processed waste is waste that has been collected within the waste bags 624 and had air pulled through to extract gases and moisture therefrom. In some embodiments, the waste may be heated by the heaters 626 to promote evaporation of any water in the waste, and thus the waste bags 624 may contain substantially dehydrated human waste (i.e., the processed waste). In some configurations, the waste bags 624 may be configured to automatically seal upon removal from a respective waste tank 616, 618. During the waste bag removal process, one or both of the fans 632, 638 may be operated to reduce stagnant air and any potential resulting odors during removal of the waste bags 624 from the waste tanks 616, 618. After removal of a used or filled waste bag 624, a new or empty waste bag 624 may be installed. The waste tank 616, 618, with the newly installed waste bag 624, may be switched to the active collection mode of operation, and the other waste tank 616, 618 may be operated in the reclamation mode of operation.

Figure 7:
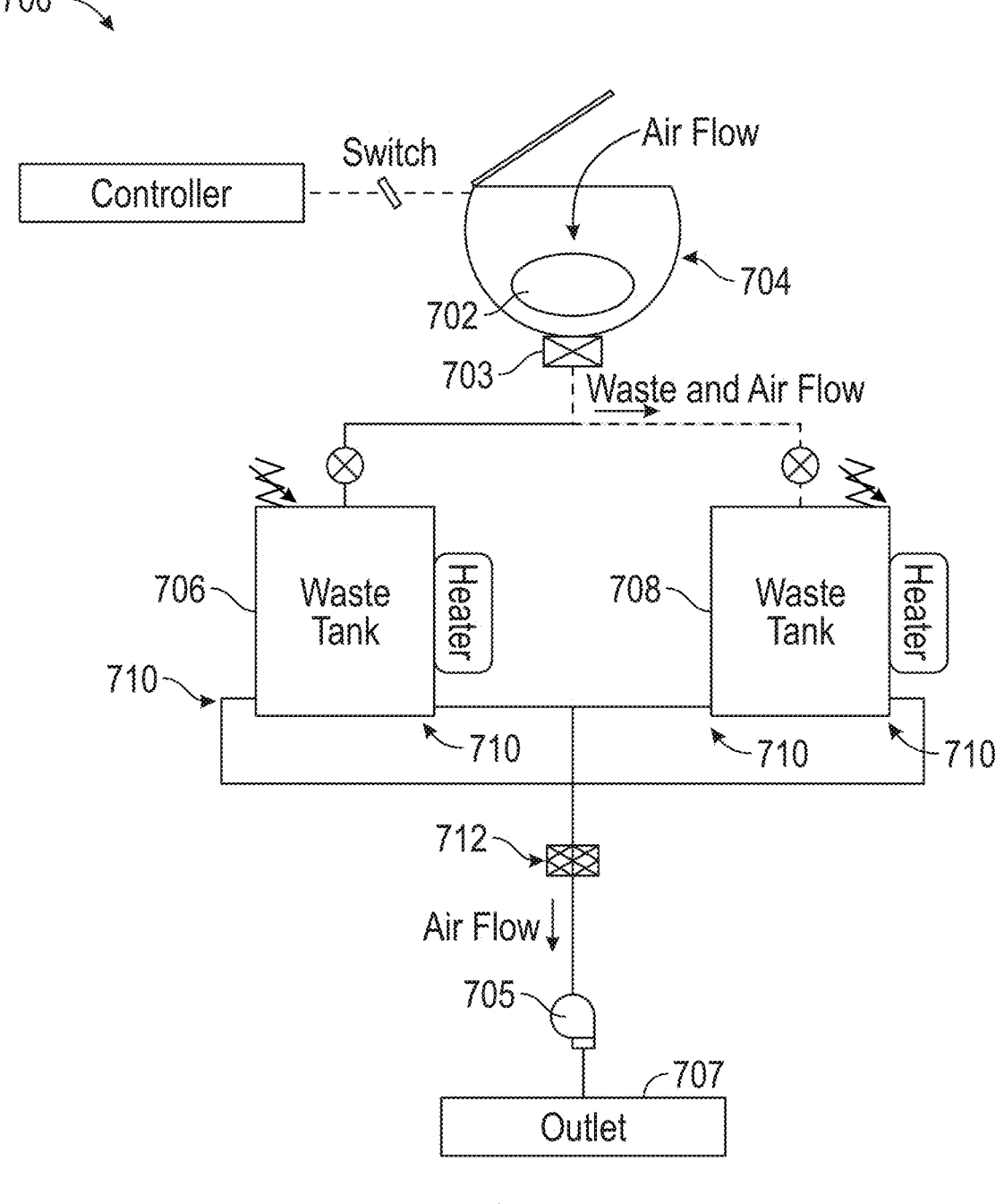
FIG. 7 is a schematic illustration of a seventh illustrative configuration of a waste collection and processing system in accordance with the present disclosure.

Referring now to FIG. 7, a schematic diagram of a waste collection and processing system 700 in accordance with another embodiment of the present disclosure is shown. The waste collection and processing system 700 is similar to that shown and described above with respect to FIGS. 5-6, and thus like features will not be described again. It will be appreciated that features of the configuration of FIG. 7 may also be implemented in combination with features of other embodiments described herein, such as that shown and described with respect to FIGS. 1-4. As such, the specific configuration illustrated in FIG. 7 is not intended to be limited to the arrangement and components as shown and described, but rather such illustration is for explanatory purposes. In the waste collection and processing system 700, the system 700 may be used with single use waste bags as opposed to a single large collection bag within each containment/processing tank. That is, each single use waste bag, in this configuration, may be used by a user for depositing waste into the waste bag while allowing for capture and reclamation of gases and liquid (e.g., water).

As shown in FIG. 7, a single-use waste bag 702 is shown arranged within a toilet 704 of the system 700. In this configuration, during waste deposit, a user will place the single-use waste bag 702 into the toilet 704 and deposit waste therein. The waste collection and processing system 700 may include an airflow capture system similar to that shown and described with respect to FIG. 6. For example, a system or arrangement similar to the waste capture airflow system 636 of system 600 may be provided to generate a forced airflow into and through the toilet 704 to aid in collection and processing of moisture and/or air, while the solid and liquid human waste may be captured and contained within the single-use waste bag 702. In some such embodiments, the reusable waste bag 702 may be configured to be used without the toilet 704. That is, the reusable waste bag 702 may be configured to couple to a valve 703 or other fluid connection interface of the system 700. In such a configuration, a fan 705 arranged at an outlet 707 of the system 700, similar to that described above, may provide a motive force to pull the waste and gases from the waste bag 702 and into/through the system 700. In still other embodiments, the bowl of the toilet 704 may be designed to assist a user with holding the single-use waste bag 702 during a waste deposit, such as providing a housing or frame that supports or holds the single-use waste bag 702.

Due to the implementation of the single-use waste bag 702, waste bags are not required to be installed within waste tanks 706, 708 of the system 700. Rather, the waste tanks 706, 708 may be configured to receive and process captured moisture and ensure separation of air and liquids for recapture and recycling. In other embodiments, each of the waste tanks 706, 708 may include a removable waste bag similar to the embodiments described above, with such waste bags being used to capture any waste that is not captured by the single-use waste bag 702. In this illustrative configuration, the waste tanks 706, 708 are configured with multiple outlets 710, as compared to the illustrated single outlet configurations shown above. The inclusion of multiple outlets on the waste tanks 706, 708 can ensure that airflow and fluid flow through the waste tanks 706, 708 is not obstructed by waste that may make it into the respective waste tanks 706, 708. This may be particularly useful for systems that do not include waste bags within the waste tanks. However, it will be appreciated that the multiple outlet configuration shown in FIG. 7 may be used in any of the illustrative embodiments of the present disclosure. For example, in any of the systems of FIGS. 1-6, the waste tanks may include multiple fluid outlets to ensure desired airflow, moisture capture, and redundancy to avoid blockage of fluid paths by waste or debris that may not be captured by the waste bags within the waste tanks. Accordingly, the use of multiple outlets on the waste tanks is not limited to the single-use waste bag configuration illustrated in FIG. 7. Although shown with two outlets on each waste tank 706, 708, it will be appreciated that any number of outlets may be provided without departing from the scope of the present disclosure.

Furthermore, it will be appreciated that in the system 700 of FIG. 7, the waste tanks 706, 708 may be operated similar to embodiments that include waste bags therein. For example, the waste tanks 706, 708 may be operated in the above described modes of operation, with an active collection waste tank and a reclamation waste tank, and swapping between these modes. Furthermore, the waste tanks 706, 708 may be arranged with heaters for causing evaporation of moisture for collection and reuse. Additionally, fluid cleaning, rinsing, and/or sanitation may be used within the bowl 704 and/or the waste tanks 706, 708. Downstream from the waste tanks 706, 708 may be a filter assembly 712 that is configured to filter gases and moisture pulled from the waste tanks 706, 708. At the outlet 707 of the system 700 may be various other systems, such as moisture capture systems and hardware and/or an opening to an occupied space (e.g., for circulating breathable air back to a cabin or the like).

Figure 8:
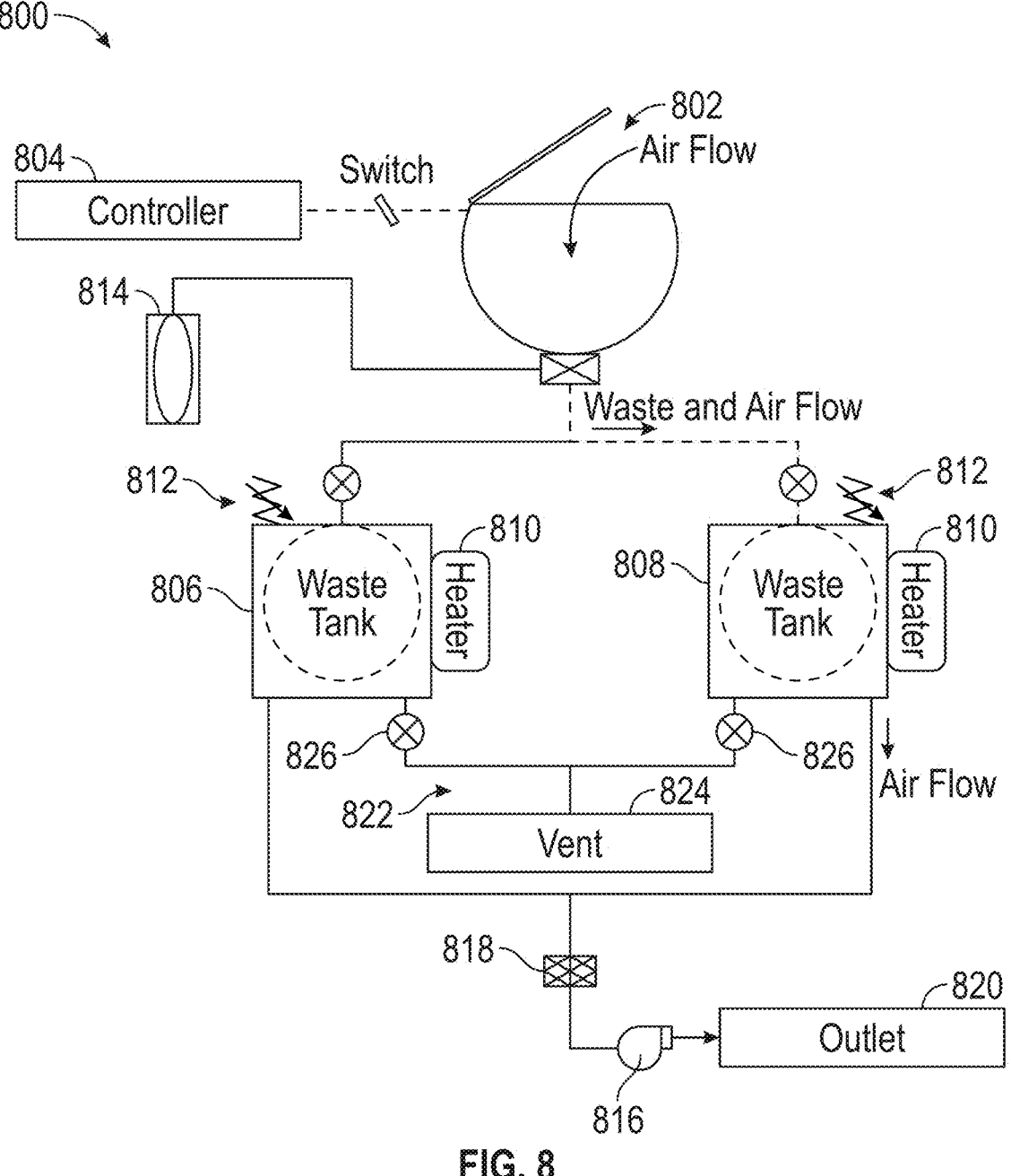
FIG. 8 is a schematic illustration of an eighth illustrative configuration of a waste collection and processing system in accordance with the present disclosure.

Referring now to FIG. 8, a schematic diagram of a waste collection and processing system 800 in accordance with another embodiment of the present disclosure is shown. The waste collection and processing system 800 is similar to that shown and described above with respect to, for example, FIGS. 5-6, and thus like features will not be described again. Furthermore, the operation of the waste collection and processing system 800 may be similar to any previously described embodiment, including the various modes of operation. The system 800 includes a toilet 802 and associated electronics including a controller 804. The toilet 802 is arranged to capture and direct human waste through the system 800. Downstream from the toilet 802 are waste tanks 806, 808, which can include optional heaters 810 and air inlets 812. A fluid injector 814 may be provided to inject water, cleaning fluids, sanitation fluids, or the like, as described above. Air and moisture may be pulled through the system 800, and waste may be captured within waste bags within the waste tanks 806, 808. A fan 816 may be configured to pull air and moisture through a filter assembly 818 and then the treated air and/or moisture may be directed to a system outlet 820 (e.g., additional processing systems and/or circulated back into an occupied space).

In contrast to the previously described embodiments, in this illustrative configuration, a venting system 822 is provided. The venting system 822 includes one or more fluid connections between the waste tanks 806, 808 and a low pressure or vacuum pressure system, indicated at vent 824. In some embodiments, the vent 824 may be an inlet or entry to a stringent air filtration hardware system that is used to aid in performing a sanitization cycle of the system 800. Such a sanitization cycle may be performed after reclamation is completed. That is, after waste has been captured and processed, the sanitization cycle may be used to ensure that waste, odors, bacteria, and the like are managed in a sanitary fashion.

In this configuration, the venting system 822 includes respective venting valves 826 on the waste tanks 806, 808, which provide a second outlet flow path for air through the system 800, different from the flow path to the system outlet 820. For example, when the venting valves 826 are open, a high pressure differential is imposed on the respective waste tank(s) 806, 808 due to low pressure (e.g., vacuum of space, a vacuum pump, or other low pressure/vacuum assembly). In some embodiments, the venting valves 826 may be controlled by the controller 804. In other embodiments, a dedicated controller for venting operations may be provided separate from the controller 804 of the reset of the system 800. In still other configurations, the venting valves 826 may be manually opened. When the venting valves 826 are opened, various other valves may be closed to fluidly isolate the waste tanks 806, 808 such that when exposed to vacuum, air from a surrounding environment (e.g., occupied space) is not pulled through the system and evacuated from a spacecraft or the like. As such, additional valves, not shown, may be arranged at all inlets/outlets of the waste tanks 806, 808 to ensure that only the waste tanks 808, 806 are exposed to the low pressure or vacuum when the venting valves 826 are opened.

In one example operation of the venting system 822, the controller 804 will operate the heaters 810 to bring the waste tank(s) 806, 808 up to an elevated sanitization temperature for a duration of time to stabilize the waste within the respective waste tank(s) 806, 808. This operation may cause release of various gases from the waste in the waste tank(s) 806, 808 and/or gases that may be released by evaporation of chemicals or the like that are used during a rinse operation or the like. It will be appreciated that any gasses from this portion of the process may need to be vented or undergo additional filtration, as high sanitization temperatures can result in unique hazards being added to the air. As such, by performing the sanitation and venting steps, harmful gases may be vented and removed without risk of such gases being introduced into an occupied space. It will be appreciated that the venting system 822 of system 800 may be incorporated to any of the other configurations and arrangements described herein, or with other systems based thereon. In some embodiments, the sanitation operation may be omitted, and the venting operation may be performed without preheating the material within the waste tanks.

Figure 9:
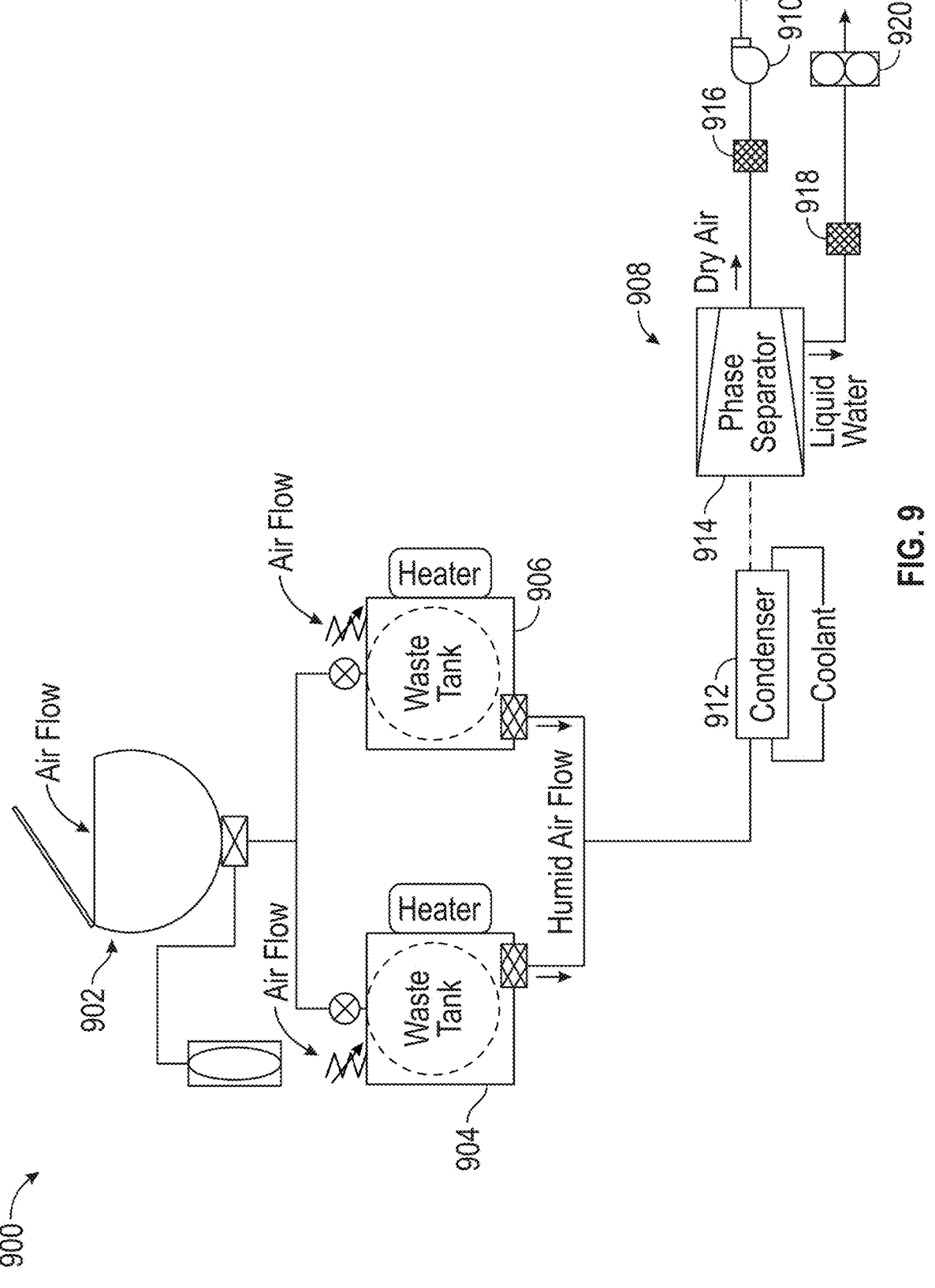
FIG. 9 is a schematic illustration of a ninth illustrative configuration of a waste collection and processing system in accordance with the present disclosure.

Referring now to FIG. 9, a schematic diagram of a waste collection and processing system 900 in accordance with another embodiment of the present disclosure is shown. The waste collection and processing system 900 is similar to that shown and described above, and thus like features will not be described again and various elements are not shown for clarity of illustration. Further, the operation of the waste collection and processing system 900 may be similar to the previously described embodiments. The system 900 includes a toilet 902 fluidly connected to multiple waste tanks 904, 906 through a fluid connection having one or more valves, fluid injectors, and the like. The operation of the waste tanks 904, 906 may be substantially similar to the operational modes described above.

In this illustrative configuration, the waste collection and processing system 900 includes a recapture system 908. The recapture system 908 is arranged downstream from the waste tanks 904, 906 of the system 900. In operation, humid or moist air may be extracted from the waste tanks 904, 906 by operation of a fan 910 (similar to the above described operations). In this configuration, the air pulled from the waste tanks 904, 906 will be directed through the recapture system 908. The air first passes through a condenser 912, which will reduce the temperature of the air and cause water to condense into water droplets that are carried on the air. The air carrying the water droplets is then directed into a phase separator 914 which is configured to separate the water content from the air, thus generating dry air and liquid water as outputs from the phase separator 914. The dry air is then passed through an air filter system 916 and may be recycled back into an occupied space or otherwise stored or used (or vented). The liquid portion (e.g., water) is directed from the phase separator 914 to a liquid filter system 918 and may be driven by a pump 920. The processed water may then be recaptured, recycled, or otherwise reused and/or stored. It will be appreciated that the recapture system 908 may be implemented with any of the embodiments described herein, such that a similar recapture system may be provided downstream from the waste tanks of the other embodiments described herein, and may be provided in combination with a venting system, such as described with respect to FIG. 8.

Figure 10:
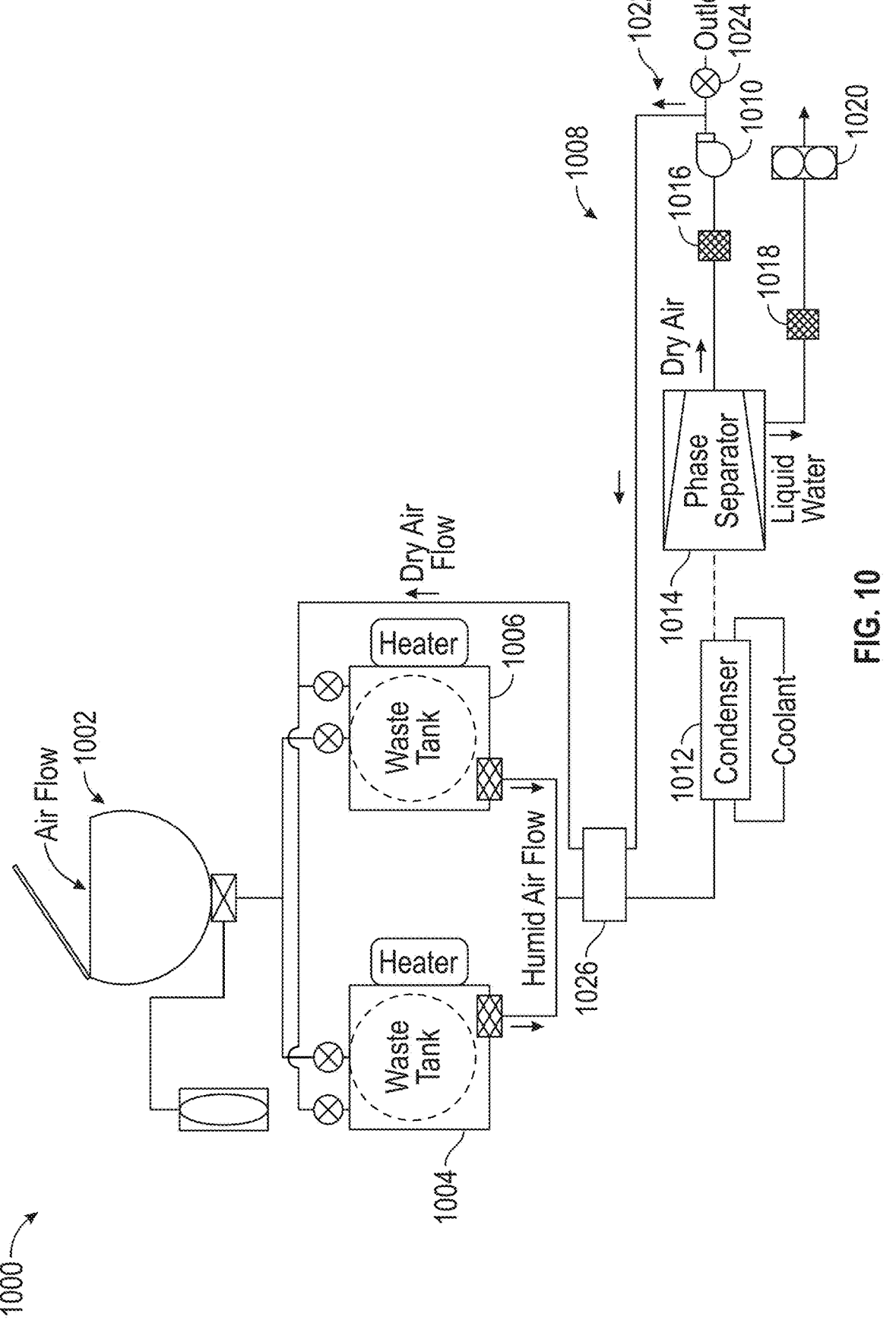
FIG. 10 is a schematic illustration of a tenth illustrative configuration of a waste collection and processing system in accordance with the present disclosure.

Referring now to FIG. 10, a schematic diagram of a waste collection and processing system 1000 in accordance with another embodiment of the present disclosure is shown. The waste collection and processing system 1000 is similar to that shown and described above, and thus like features may not be shown or described again. The operation of the waste collection and processing system 1000 may be similar to the previously described embodiments. The system 1000 includes a toilet 1002 fluidly connected to multiple waste tanks 1004, 1006 through a fluid connection having one or more valves, fluid injectors, and the like. The operation of the waste tanks 1004, 1006 may be substantially similar to the operational modes described above.

In this illustrative configuration, the waste collection and processing system 1000 includes a recapture system 1008. The recapture system 1008 is arranged downstream from the waste tanks 1004, 1006 of the system 1000. In operation, humid or moist air may be extracted from the waste tanks 1004, 1006 by operation of a fan 1010 (similar to the above described operations). The recapture system 1008 of FIG. 10 may be similar to the system described with respect to FIG. 9, having a condenser 1012, a phase separator 1014, an air filter system 1016, a liquid filter system 1018, and a pump 1020 for pumping the liquid portion from the phase separator 1014.

In this configuration, downstream from the fan 1010, and along the air outlet/output from the phase separator 1014, is a recirculation junction 1022. The recirculation junction 1022 has a controllable valve 1024 associated therewith. The recirculation junction 1022 is arranged to selectively direct at least a portion of dry air that has been processed through the recapture system 1008 back into the system 1000. For example, dry and conditioned air may be recirculated from the recapture system 1008 back to the waste tanks 1004, 1006. The recirculated air may be used to provide an airflow through the waste tanks 1004, 1006, and may provide similar functionality to the air inlets on the waste tanks that is described with respect to other embodiments herein. Further, in some configurations, a combination of air inlets (e.g., FIGS. 5-6) and recirculated dry air (e.g., FIG. 10) may be employed without departing from the scope of the present disclosure.

In some embodiments, and as shown in FIG. 10, the system 1000 includes an optional regenerative heat exchanger 1026 arranged along the recirculation loop from the phase separator 1014 back to the waste tanks 1004, 1006. The regenerative heat exchanger 1026 may be arranged to provide a thermal exchange between the treated, dry air, and the output humid airflow that exits the waste tanks 1004, 1006. The regenerative heat exchanger 1026 may be provided to increase an efficiency of the system 1000. For example, the dry air may pick up heat from the humid air output from the waste tanks 1004, 1006, which may be have been heated using heaters, as described above. As the dry air picks up heat, it will cause a reduction in temperature of the humid air that is passed into the condenser 1012 and the phase separator 1014. Accordingly, the power and operational requirements of the condenser 1012 and/or the phase separator 1014 may be reduced. In some embodiments, the regenerative heat exchanger 1026 may replace the condenser 1012, and provide the pre-cooling to the humid air before entering the phase separator 1014. Additionally, the warmed, dry air that is recirculated back to the waste tanks 1004, 1006 may improved water pickup in the waste tanks 1004, 1006, which can result in increased reclamation rates.

Figure 11:
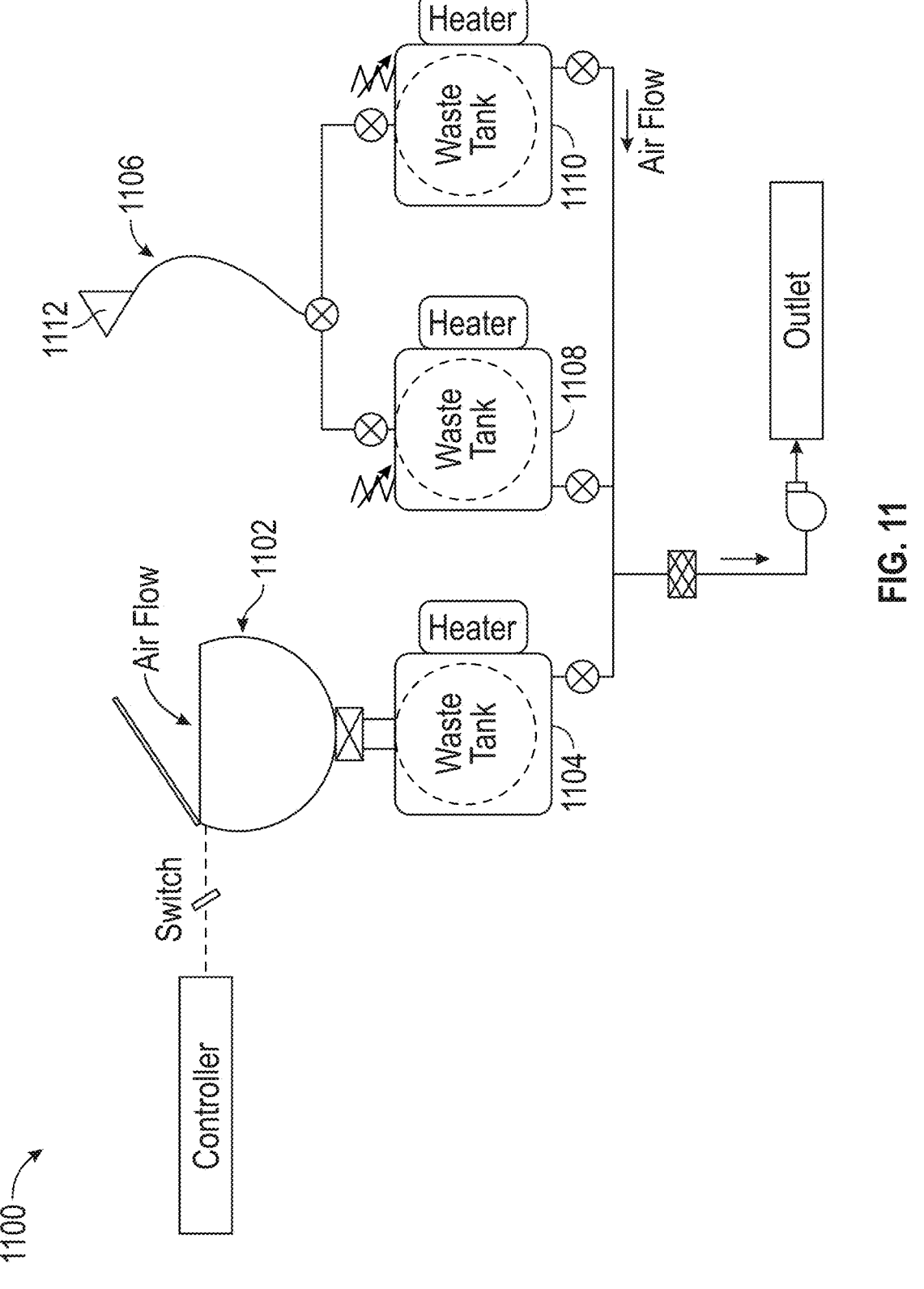
FIG. 11 is a schematic illustration of an eleventh illustrative configuration of a waste collection and processing system in accordance with the present disclosure.

Referring now to FIG. 11, a schematic diagram of a waste collection and processing system 1100 in accordance with another embodiment of the present disclosure is shown. The waste collection and processing system 1100 is similar to that shown and described above, and thus like features may not be shown or described again. Furthermore, the operation of the waste collection and processing system 1100 may be similar to the previously described embodiments. The system 1100 includes a toilet 1102 fluidly connected to a first waste tank 1104 and a liquid waste collection system 1106 fluidly connected to a second waste tank 1108 and a third waste tank 1110. The fluid connections may include one or more valves, fluid injectors, and the like, as described above. The operation of the waste tanks 1104, 1108, 1110 may be substantially similar to the operational modes described above.

In this illustrative configuration, the waste collection and processing system 1100 includes separate waste capture mechanisms, such as similar to the embodiment of FIG. 2. In this configuration, the toilet 1102 is fluidly connected with a single waste tank 1104 for solid waste collection, which may be functionally similar to various embodiments described herein. The liquid waste collection system 1106 is provided in parallel with the solid waste collection. The liquid waste collection system 1106 is configured similar to the dual waste tank systems shown and described above, but with the dual waste tank system applied to liquid waste capture and processing rather than all waste (e.g., compare with FIGS. 5-9). The liquid waste collection system 1106 includes a second waste tank 1108 and a third waste tank 1110 which may be alternated in operational modes (e.g., between active/capture and reclamation), as described above. The liquid waste capture of the liquid waste collection system 1106 may be by a funnel, hose, or the like (e.g., as shown in FIG. 2) or may be a feature integrated into and/or part of the toilet 1102 (e.g., as shown in FIG. 3). In the hose configuration, as shown, a liquid waste receptacle 1112 may be used which is structurally separate from the toilet 1102. In other configurations that incorporate a urine capture element as part of the toilet 1102 (e.g., as shown in FIG. 3), a hose or conduit may be arranged to receive the liquid waste and directed it to the waste tanks 1108, 1110 (e.g., similar to the fluid connection between the liquid waste receptacle 308 and the waste tank 312 shown in FIG. 3).

It will be appreciated that the toilet 1102 may be configured with dual waste tanks, as shown and described above. In such a configuration, the system may include four (or more) separate waste tanks, with at least two for each waste stream (liquid and all other waste). Furthermore, in some embodiments, a two-stage airflow system may be implemented within the toilet 1102 and/or the liquid waste receptacle 1112 of the liquid waste collection system 1106, such as shown and described with respect to FIG. 6 (waste capture airflow system 636). Further, in some embodiments, single bag or single-use bag configurations are possible, with the waste bags used similarly as shown and described with respect to FIG. 7. In such a configuration, the waste tanks 1104, 1108, 1110 may be provided with multiple outlets to ensure that the outflow from the respective waste tanks 1104, 1108, 1110 does not clog with waste material.

In some applications, the waste collection and processing systems of the present disclosure may be configured for short duration operations/flights. During short duration operations/flights, the considerations of waste management may be different. For example, waste recycling and recapture may not be a primary focus, as the limited resource availability may not be as impactful on relatively short missions and/or where resupply is readily available. Examples of short duration operations may be missions that last about a month or less, and longer duration operations may be missions of one month or longer.

Figure 12:
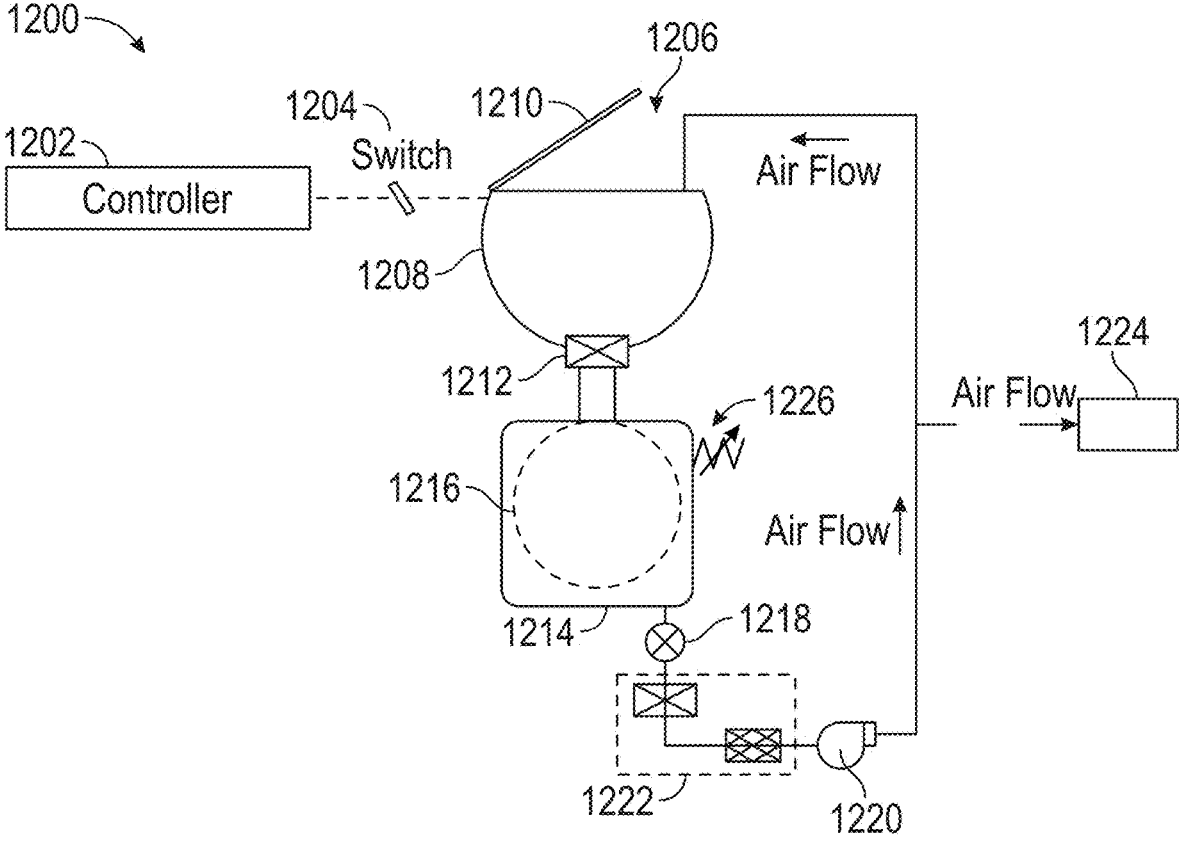
FIG. 12 is a schematic illustration of a twelfth illustrative configuration of a waste collection and processing system in accordance with the present disclosure.

Referring now to FIG. 12, a schematic diagram of a waste collection and processing system 1200 in accordance with another embodiment of the present disclosure is shown. As illustrated, the waste collection and processing system 1200 includes a controller 1202, a switch 1204, and a toilet 1206 having a bowl 1208 and a lid 1210, similar to that shown and described above, and thus the details of which will not be repeated again. At the outlet of the bowl 1208 is a selectively operable first valve 1212 that is configured to be controlled by the controller 1202. As shown, in this configuration, a single waste tank 1214 with a waste bag 1216 is provided. The system 1200 may include fluid injectors within the bowl 1208 and/or along a flow path from the bowl 1208 to the waste tank 1214, as shown and described above.

The system 1200 includes a second valve 1218 that is arranged at an outlet of the waste tank 1214. Similar to the systems described above, a fan 1220 may be used to pull air through the waste tank 1214 and the waste bag 1216 to extract moisture and/or air from the waste tank 1214. The extracted air is then pulled (or pushed) through an air filter assembly 1222, which may include various filters, separators, and the like for removing odors and/or moisture. The fan 1220 may then direct the treated air back to an occupied space 1224 (e.g., cabin or the like) or the treated air may be recycled or redirected back into the bowl 1208 and/or the waste tank 1216 to provide dry, moving air for waste capture and/or waste processing within the waste tank 1214 and waste bag 1216. In some embodiments, the fan 1220 may be operated only during a waste deposit or reclamation operation (i.e., when in use). However, in other embodiments, the valves 1212, 1218 may be kept open (or partially open) for continuous cycling of air through the system 1200. The partial open state of the valves 1212, 1218 may be selected to allow continuous airflow without providing a strong airflow therethrough, such as to minimize power consumption and/or to minimize release of odors or the like. In some such configurations, when a waste deposit is being made, the fan 1220 may be operated at a high flow rate to pull waste into the bowl 1208 and/or waste tank 1214, and when not in use by a user, the fan 1220 may be operated at a low flow rate for continuous dry air circulation. In some such configurations, the lid 1210 may be sealed to the bowl 1208, and the continuous airflow may be substantially closed loop, or air may be pulled into the system 1200 through an air inlet 1226, as described above. Further, in some configurations, single-use waste bags may be employed, which may be used within or in combination with the toilet 1206. In such a configuration, the waste tank 1214 may include multiple outlets to ensure blockage does not occur, such as shown FIG. 7.

It will be appreciated that the system 1200 of FIG. 12 may also be used for longer duration missions/operations, although such systems may include reclamation, recapture, and recycling components, such as those shown and described above. Further, it will be appreciated that the waste collection and processing systems described herein can be adjusted to perform for a specific mission or operation. For example, a craft may be configured with one of the more complex systems described herein, but not all components may need to be operated at all times.

As discussed throughout the present disclosure, and in view of the teachings herein, it will be readily appreciated that various features from the specifically described embodiments may be combined with features from other embodiments, or may incorporate features not specifically shown and described. For example, each of the above described configurations may be implemented with disposable waste bags, reusable waste bags, or may be used with single-use waste bags. Furthermore, for example, water reclamation may be implemented in any of the above described embodiments. As such, it will be appreciated that the specific embodiments described herein are for illustrative and explanatory purposes and are not intended to be limited to the specific set of components and arrangements thereof, as illustrated and described.

Advantageously, embodiments described herein provide for improved waste collection and processing systems. In accordance with some embodiments of the present disclosure, waste collection and processing systems are provided with various mechanisms for waste capture, collection, treatment, processing, and the like, as described herein. Embodiments of the present disclosure provide for improved and more user-friendly waste collection and processing systems that are operable in low-gravity environments, for both short duration and long duration mission. The systems described herein enable reclamation, processing, recycling, and recapture of usable resources that can be extracted from human waste. For example, embodiments of the present disclosure may be configured to recycle or capture moisture from human waste, and thus water supplies may be replenished or the amount of water to be carried may be reduced. Furthermore, advantageously, embodiments of the present disclosure may reduce costs and complexity of human waste management systems for space-based and low-gravity environment applications.

Further advantages of the present systems may include elimination of the need for pretreating. In current solutions/systems, the addition of pretreating includes a chemical that is added to urine to make the mixed fluid compatible with downstream systems and storage. Such pretreat chemicals may reduce ammonia off-gassing of the waste and solidification of salts and other urine constituents that could harm rotating machinery or block flow paths. The pretreat chemicals may be highly acidic chemicals that are considered a toxic fluid, and thus may drive additional safety considerations and complications. Additionally, pretreating operations and the hardware required to inject/apply the pretreat chemicals may add to the maintenance/operating mass required for the system. Accordingly, advantageously, by eliminating the pretreating of conventional systems, embodiments of the present disclosure may minimize the complexity, mass, volume, and power of the system. Moreover, embodiments of the present disclosure can reduce the amount of human interaction at each step of operation, thus improving sanitation and safety. Additionally, the quantity of consumables associated human waste in low-gravity environments may be reduced through use of the waste tanks, as described herein. These and other advantages and benefits of the systems and processes disclosed herein will be apparent to those of skill in the art in view of the above discussion and description.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A waste collection and processing system for use in low-gravity environments, the waste collection and processing system comprising:
    a toilet having a bowl and a lid;
    a first waste tank having an inlet and an outlet, wherein the bowl of the toilet is selectively fluidly coupled to the inlet of the first waste tank;
    a second waste tank having an inlet and an outlet, wherein the bowl of the toilet is selectively fluidly coupled to the inlet of the second waste tank;
    a controller configured to selectively operate each of the first waste tank and the second waste tank between reclamation modes of operation and collection modes of operation, wherein:
        when the first waste tank is operated in the reclamation mode of operation the second waste tank is operated in the collection mode of operation; and
        when the first waste tank is operated in the collection mode of operation the second waste tank is operated in the reclamation mode of operation.

2. The waste collection and processing system of claim 1, further comprising a switch configured to be actuated to cause operation of the controller.

3. The waste collection and processing system of claim 2, wherein the switch is integral with the toilet and configured to be actuated in response to opening and closing of the lid.

4. The waste collection and processing system of claim 1, further comprising a filter assembly arranged downstream from the first waste tank and the second waste tank and configured to receive a gas from the first waste tank and the second waste tank when the respective waste tank is in the reclamation mode of operation.

5. The waste collection and processing system of claim 4, further comprising a fan configured to pull the gas from the respective waste tank into the filter assembly.

6. The waste collection and processing system of claim 4, further comprising waste capture hardware arranged at the outlet of each of the first waste tank and the second waste tank, and upstream from the filter assembly.

7. The waste collection and processing system of claim 4, further comprising an outlet valve at the outlet of each of each of the first waste tank and the second waste tank, and upstream from the filter assembly.

8. The waste collection and processing system of claim 1, further comprising a first waste bag arranged within the first waste tank and a second waste bag arranged within the second waste tank, wherein each of the first waste bag and the second waste bag are permeable to gas and impermeable to liquid waste and solid waste.

9. The waste collection and processing system of claim 1, further comprising a first heater operably coupled to the first waste tank and a second heater operably coupled to the second waste tank.

10. The waste collection and processing system of claim 1, further comprising at least one fluid injector arranged to inject at least one of water, cleaning fluid, and waste treatment fluid into at least one of the bowl and a flow path between the bowl and the first and second waste tanks.

11. The waste collection and processing system of claim 1, further comprising a waste capture airflow system integrated with the toilet, the waste capture airflow system configured to generate a flow of air through the bowl.

12. The waste collection and processing system of claim 11, wherein the generated flow of air from the waste capture airflow system is directed to capture and direct human waste into and through the bowl toward the waste tank that is operated in the capture mode of operation.

13. The waste collection and processing system of claim 1, wherein the controller is configured to cause an airflow through the waste tank operated in the reclamation mode of operation to direct air from the respective waste tank to a system outlet.

14. The waste collection and processing system of claim 13, wherein the system outlet is an occupied space that is part of a spacecraft.

15. The waste collection and processing system of claim 13, wherein the system outlet is an occupied space that is part of a space station.

16. The waste collection and processing system of claim 1, further comprising a waste bag arranged within the bowl, the waste bag being permeable to gas and impermeable to liquid waste and solid waste.

17. The waste collection and processing system of claim 1, further comprising a venting system fluidly coupled to the outlets of each of the first waste tank and the second waste thank, the venting system operable to perform a sanitation operate to vent the first and second waste tanks.

18. The waste collection and processing system of claim 1, further comprising a recapture system arranged downstream from the first waste tank and the second waste tank, the recapture system configured to process humid air received from the first and second waste tanks.

19. The waste collection and processing system of claim 18, wherein the recapture system comprises:
    a condenser arranged to receive the humid air from the first and second waste tanks and cool the humid air;
    a phase separator arranged to receive the cooled humid air and separate water content from the air,
    wherein the air from the phase separator is treated at an air filter system, and
    wherein the water from the phase separator is treated in a liquid filter system.

20. The waste collection and processing system of claim 19, further comprising a regenerative heat exchanger configured to receive an output from the first and second waste tanks as a first working fluid and the treated air from the air filter system as a second working fluid, the regenerative heat exchanger configured to cool the output from the first and second waste tanks prior to entering the condenser.

\* \* \* \* \*